(12) United States Patent
Wippermann et al.

(10) Patent No.: US 11,611,736 B2
(45) Date of Patent: Mar. 21, 2023

(54) MULTI-APERTURE IMAGING DEVICE WITH A WAVELENGTH-SPECIFIC BEAM DEFLECTOR AND DEVICE HAVING SUCH A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Jena (DE); Jacques Duparré, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 7 days.

(21) Appl. No.: 17/329,667

(22) Filed: May 25, 2021

(65) Prior Publication Data
US 2021/0281819 A1 Sep. 9, 2021

Related U.S. Application Data

(63) Continuation of application No. PCT/EP2019/083521, filed on Dec. 3, 2019.

(30) Foreign Application Priority Data

Dec. 10, 2018 (DE) .......................... 102018221358.5
Dec. 21, 2018 (DE) .......................... 102018222830.2

(51) Int. Cl.
*H04N 13/271* (2018.01)
*H04N 13/207* (2018.01)
(Continued)

(52) U.S. Cl.
CPC ......... *H04N 13/271* (2018.05); *H04N 5/2254* (2013.01); *H04N 13/207* (2018.05); *H04N 13/254* (2018.05)

(58) Field of Classification Search
CPC ....... G02B 5/26; G02B 26/0816; G03B 17/17
See application file for complete search history.

(56) References Cited

U.S. PATENT DOCUMENTS

| 6,342,940 B1 | 1/2002 | Shimizu et al. |
| 9,782,056 B2 | 10/2017 | McDowall |
(Continued)

FOREIGN PATENT DOCUMENTS

| AT | 518355 A1 | 9/2017 |
| DE | 102015215833 A1 | 2/2017 |
(Continued)

*Primary Examiner* — Jayanti K Patel
*Assistant Examiner* — Christopher Kingsbury Glover
(74) *Attorney, Agent, or Firm* — Perkins Coie LLP; Michael A. Glenn

(57) ABSTRACT

A multi-aperture imaging device is provided that includes an image sensor and an array of adjacently arranged optical channels. Each optical channel includes an optic for imaging at least one partial field of view of a total field of view onto an image sensor area of the image sensor. The device has a beam-deflector for deflecting an optical path of the optical channels and the beam-deflector includes a first beam-deflecting area operative for a first wavelength range of electromagnetic radiation passing through the optical channel; and a includes second beam-deflecting area operative for a second wavelength range of the electromagnetic radiation passing through the optical channels. The second wavelength range is different from the first wavelength range.

18 Claims, 21 Drawing Sheets

(51) Int. Cl.
*H04N 13/254* (2018.01)
*H04N 5/225* (2006.01)

(56) References Cited

U.S. PATENT DOCUMENTS

| | | |
|---|---|---|
| 10,560,617 B2 | 2/2020 | Wippermann et al. |
| 10,567,629 B2 | 2/2020 | Wippermann et al. |
| 10,630,902 B2 | 4/2020 | Wippermann et al. |
| 10,708,570 B2 | 7/2020 | Wippermann et al. |
| 11,016,273 B2 | 5/2021 | Wippermann et al. |
| 2014/0055624 A1* | 2/2014 | Gaines .................... G02B 5/08 348/207.1 |
| 2014/0110585 A1* | 4/2014 | Justice .................. H04N 5/332 250/208.1 |
| 2017/0096144 A1* | 4/2017 | Elie ....................... G06V 20/56 |
| 2018/0176471 A1* | 6/2018 | Wippermann ....... H04N 5/2259 |
| 2018/0241920 A1 | 8/2018 | Wippermann et al. |
| 2020/0057310 A1 | 2/2020 | Wippermann et al. |

FOREIGN PATENT DOCUMENTS

| | | |
|---|---|---|
| DE | 102015215841 A1 | 2/2017 |
| DE | 102015220566 A1 | 4/2017 |
| DE | 102016208210 A1 | 11/2017 |
| DE | 102017208709 B3 | 10/2018 |
| JP | 2000190566 A | 7/2000 |
| JP | 2004054108 A | 2/2004 |
| JP | 2018533038 A | 11/2018 |
| KR | 2014019044 A * | 2/2014 |
| KR | 20140019044 A | 2/2014 |
| KR | 101789317 B1 | 10/2017 |
| TW | 201713988 A | 4/2017 |
| TW | 201713993 A | 4/2017 |
| WO | 2018215311 A1 | 11/2018 |

* cited by examiner

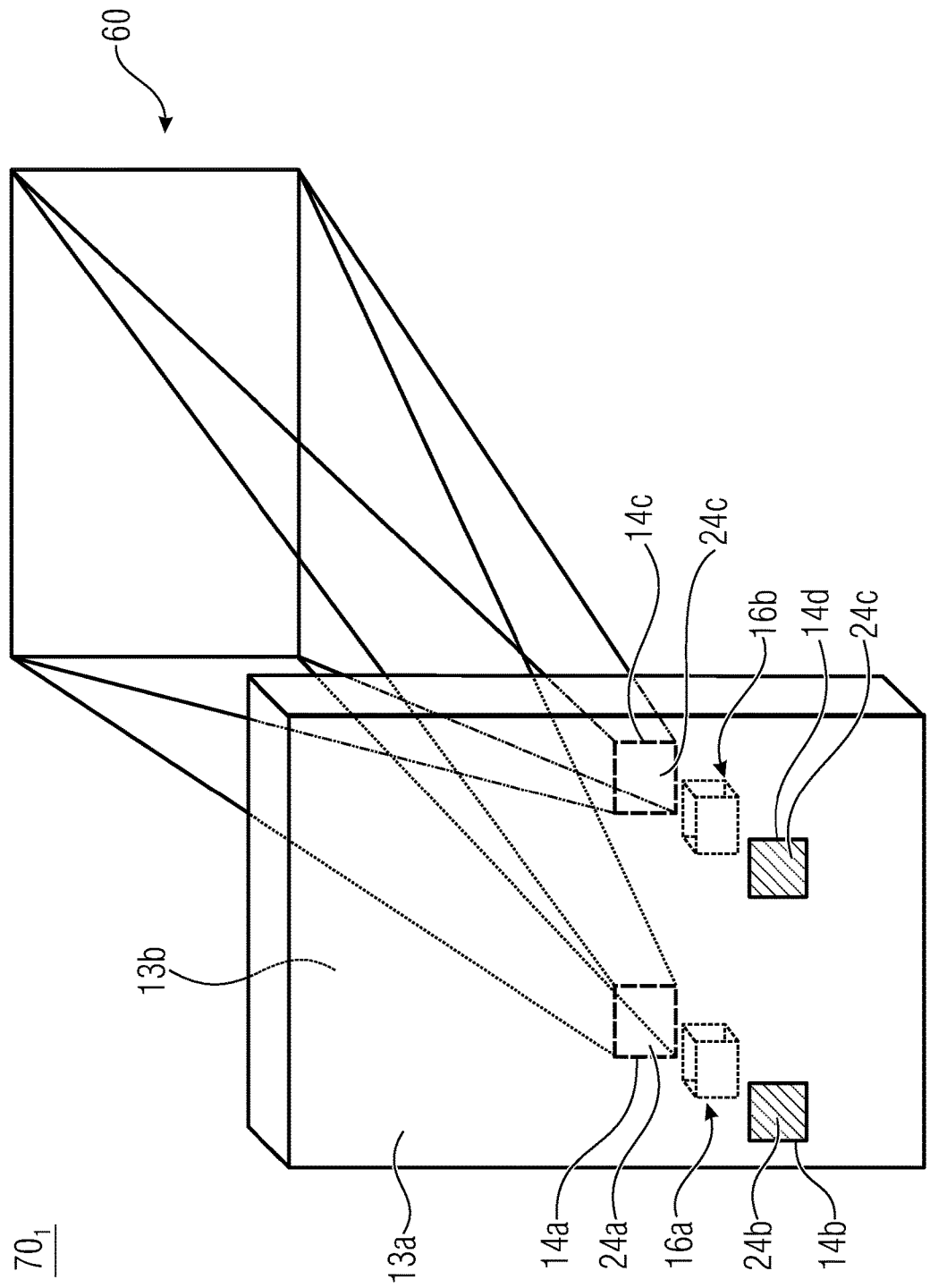

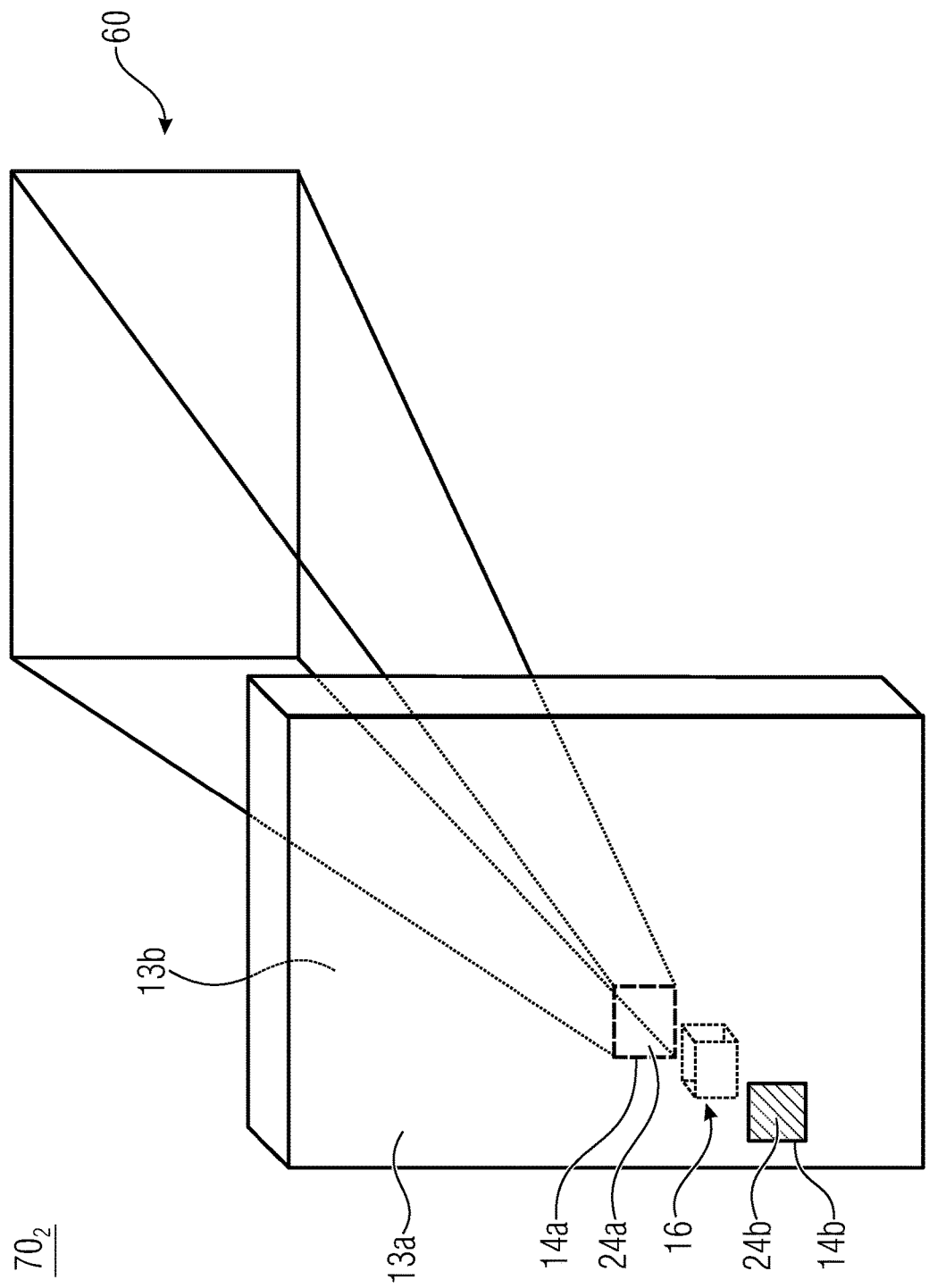

MULTI-APERTURE IMAGING DEVICE WITH A WAVELENGTH-SPECIFIC BEAM DEFLECTOR AND DEVICE HAVING SUCH A MULTI-APERTURE IMAGING DEVICE

CROSS-REFERENCES TO RELATED APPLICATIONS

This application is a continuation of copending International Application No. PCT/EP2019/083521, filed Dec. 3, 2019, which is incorporated herein by reference in its entirety, and additionally claims priority from German Applications Nos. DE 102018221358.5, filed Dec. 10, 2018, and DE 102018222830.2, filed Dec. 21, 2018, both of which are incorporated herein by reference in their entirety.

The present invention relates to a multi-channel imaging device and to a device having a multi-channel imaging device. The present invention further relates to a portable device having a multi-aperture imaging device.

BACKGROUND OF THE INVENTION

Conventional cameras transmit the total field of view within one channel and are limited in terms of their miniaturization. In mobile devices such as smart phones, for example, two cameras are employed which are oriented in and counter to the direction of the surface normal of the display.

Therefore, what would be desirable is a concept which enables miniaturized devices to capture a total field of view while ensuring high image quality.

SUMMARY

According to an embodiment, a multi-aperture imaging device may have: an image sensor; an array of adjacently arranged optical channels, wherein each optical channel includes an optic for imaging at least one partial field of view of a total field of view onto an image sensor area of the image sensor, a beam-deflecting means for deflecting an optical path of the optical channels, wherein the beam-deflecting means includes a first beam-deflecting area operative for a first wavelength range of electromagnetic radiation passing through the optical channel; and a second beam-deflecting area operative for a second wavelength range of the electromagnetic radiation passing through the optical channels, the second wavelength range being different from the first wavelength range.

According to another embodiment, a device may have a multi-aperture imaging device, which multi-aperture imaging device may have:
an image sensor;
an array of adjacently arranged optical channels, wherein each optical channel includes an optic for imaging at least one partial field of view of a total field of view onto an image sensor area of the image sensor,
a beam-deflecting means for deflecting an optical path of the optical channels, wherein the beam-deflecting means includes a first beam-deflecting area operative for a first wavelength range of electromagnetic radiation passing through the optical channel; and a second beam-deflecting area operative for a second wavelength range of the electromagnetic radiation passing through the optical channels, the second wavelength range being different from the first wavelength range, configured to generate a depth map of the total field of view.

A core idea of the present invention consists in having found that the above object may be achieved in that, by capturing the total field of view in different wavelength ranges, a large amount of image information may be obtained, enabling a small number of capturing channels and therefore small installation sizes and low costs.

According to an embodiment, a multi-aperture imaging device includes an image sensor; an array of adjacently arranged optical channels, wherein each optical channel includes an optic for imaging at least one partial field of view of a total field of view onto an image sensor area of the image sensor. The multi-aperture imaging device comprises a beam-deflecting means for deflecting an optical path of the optical channels, wherein the beam-deflecting means comprises a first beam-deflecting area operative for a first wavelength range of electromagnetic radiation passing through the optical channel; and a second beam-deflecting area operative for a second wavelength range of the electromagnetic radiation passing through the optical channel, the second wavelength range being different from the first wavelength range. This is advantageous in that images may be captured in different wavelength ranges using the same camera, or the same channels.

According to an embodiment, the multi-aperture imaging device is configured to capture with the image sensor a first capturing of the total field of view using the first beam-deflecting area so that the first capturing is based on the first wavelength range; and to capture with the image sensor a second capturing of the total field of view using the second beam-deflecting area so that the second capturing is based on the second wavelength range.

According to an embodiment, the multi-aperture imaging device is configured to determine, using the second capturing, a depth map for the first capturing. This enables obtaining depth information with respect to the total field of view.

According to an embodiment, the first beam-deflecting area is arranged on a first side of the beam-deflecting means, and the second beam-deflecting area is arranged on a second side arranged opposite to the first side, and the beam-deflecting means is configured such that, in order to capture a first capturing of the total field of view, the first side is arranged to face the image sensor, and, in order to capture a second capturing of the total field of view, the second side is arranged to face the image sensor.

According to an embodiment, a first side of the beam-deflecting means comprises a coating different from that of a second side opposite thereto in order to be operative in the first and second wavelength ranges, respectively.

According to an embodiment, the beam-deflecting means is configured, when operative in the first wavelength range, to reflect the first wavelength range and to at least partially absorb wavelength ranges different thereto, and/or the beam-deflecting means is configured, when active in the second wavelength range, to reflect the second wavelength range and to at least partially absorb wavelength ranges different thereto. This enables reducing or avoiding stray light in the capturings and therefore a high image quality.

According to an embodiment, the total field of view is a first total field of view, and the multi-aperture imaging device comprises a first viewing direction for capturing the first total field of view and a second viewing direction towards a second total field of view. The multi-aperture imaging device is configured to capture with the image sensor a third capturing of the second total field of view using the first beam-deflecting area so that the third capturing is based on the first wavelength range; and to capture with the image sensor a fourth capturing of the second total field of view using the second beam-deflecting area so that the fourth capturing is based on the second wavelength range. Thus, the two, possibly spaced apart, total fields of view may be captured in both wavelength ranges.

According to an embodiment, the first total field of view and the second total field of view are arranged along different main directions of the multi-aperture imaging device, and the beam-deflecting areas, when executing a continuous rotational movement, deflect the optical path alternately towards the first total field of view and the second total field of view and alternately with the first beam-deflecting area and the second beam-deflecting area. This may be an implemented or theoretical consideration of the movement sequence. In particular, embodiments provide that, for changing a position of the beam-deflecting means, a shortest path and therefore shortest actuating time is implemented so that the beam-deflecting means may be moved in different directions.

According to an embodiment, the beam-deflecting means is configured, for obtaining a first capturing of the total field of view, to comprise a tilt angle of 45°±10° of the first beam-deflecting area with respect to the image sensor and, for obtaining a second capturing of the total field of view, to comprise a tilt angle of 45°±10° of the second beam-deflecting area with respect to the image sensor. This tilt angle enables deflecting the optical path by approximately 90° and enables a smaller installation size of the multi-aperture imaging device, since the low thickness of the multi-aperture imaging device may be advantageously used.

According to an embodiment, the multi-aperture imaging device is configured to capture the total field of view through at least two partial fields of view and to capture at least one of the partial fields of view through at least one first optical channel and one second optical channel. This enables avoiding or reducing occlusion effects.

According to an embodiment, the multi-aperture imaging device is configured to segment the total field of view into exactly two partial fields of view in order to exactly capture one of the partial fields of view through a first optical channel and a second optical channel. This enables reducing or avoiding the occlusions and, at the same time, a small number of optical channels, enabling a small installation size and/or low costs.

According to an embodiment, the first optical channel and the second optical channel are spaced apart by at least one further optical channel in the array. This enables avoiding or reducing occlusion effects. Particularly with a symmetrical arrangement of the optical channels capturing the partial field of view around a further optical channel, occlusion effects may be reduced or avoided. For example, a first partial field of view is captured by channels left and right of the channel that captures a second partial field of view, in particular when dividing the total field of view into exactly two partial fields of view along a vertical direction, or perpendicular to a direction along which the optical channels in the array of optical channels are arranged, the line-extension direction.

According to an embodiment, the beam-deflecting means is formed as an array of facets, wherein each optical channel is assigned to one facet, and each of the facets comprises the first beam-deflecting area and the second beam-deflecting area. This enables a facet-individual or even channel-individual adjustment of a divergence in the deflected optical channels so that the adjusted portion of divergence does not have to be adjusted in the optical channels, or the optics, themselves.

According to an embodiment, the facets of the array of facets are formed as mirrors that are reflective on both sides and plane-parallel on both sides. This enables a simple implementation of the facets.

According to an embodiment, the image sensor areas are configured for the image generation in the first wavelength range and for the image generation in the second wavelength range. This enables a space-efficient implementation of the image sensor.

According to an embodiment, pixels of the image sensor areas are configured for the image generation in the first wavelength range and at least partially for the image generation in the second wavelength range. For example, this may be achieved by arranging corresponding filters and/or via the integration or substitution of correspondingly implemented photo cells in groups of photo cells, e.g. in a Bayer pattern.

According to an embodiment, the first wavelength range includes a visible spectrum and the second wavelength range includes an infrared spectrum, in particular a near-infrared spectrum. This enables implementing the multi-aperture imaging device such that additional image information may be obtained by means of the infrared spectrum.

According to an embodiment, the multi-aperture imaging device further comprises an illumination means configured to emit a temporal or spatial illumination pattern with a third wavelength range, which at least partially corresponds to the second wavelength range. This enables a selective illumination of the total field of view with light of the second wavelength range so that the arrangement of further illumination sources may be omitted for this wavelength range.

According to an embodiment, the multi-aperture imaging device is configured to capture the total field of view at least stereoscopically. This enables an additional increase of the obtained image information.

According to an embodiment, the beam-deflecting means is configured to block or to attenuate the second wavelength range with the first beam-deflecting area, and to block or attenuate the first wavelength range with the second beam-deflecting area. This enables isolating the wavelength ranges during the deflection so that the image sensor is only hit by light to be used in the desired capturing.

According to an embodiment, a device includes an inventive multi-aperture imaging device and is configured to generate a depth map of the total field of view.

According to an embodiment, the device does not comprise an additional infrared camera.

According to an embodiment, the device is configured to capture the total field of view from a perspective, and to not provide a stereoscopic capturing of the total field of view. This implementation is particularly advantageous with the generation of depth information based on the different wavelength ranges, enabling the omission of additional imaging modules for the purposes of stereoscopy.

BRIEF DESCRIPTION OF THE DRAWINGS

Embodiments of the present invention will be detailed subsequently referring to the appended drawings, in which:

FIG. 7a shows a schematic perspective view of a device including two multi-aperture imaging devices for stereoscopically capturing a total field of view in accordance with an embodiment;

FIG. 7b shows a schematic perspective view of a device including two multi-aperture imaging devices in accordance with an embodiment, configured to, instead of a stereoscopic capturing, create the depth information from the capturing in one of the wavelength ranges;

DETAILED DESCRIPTION OF THE INVENTION

Figure 1:
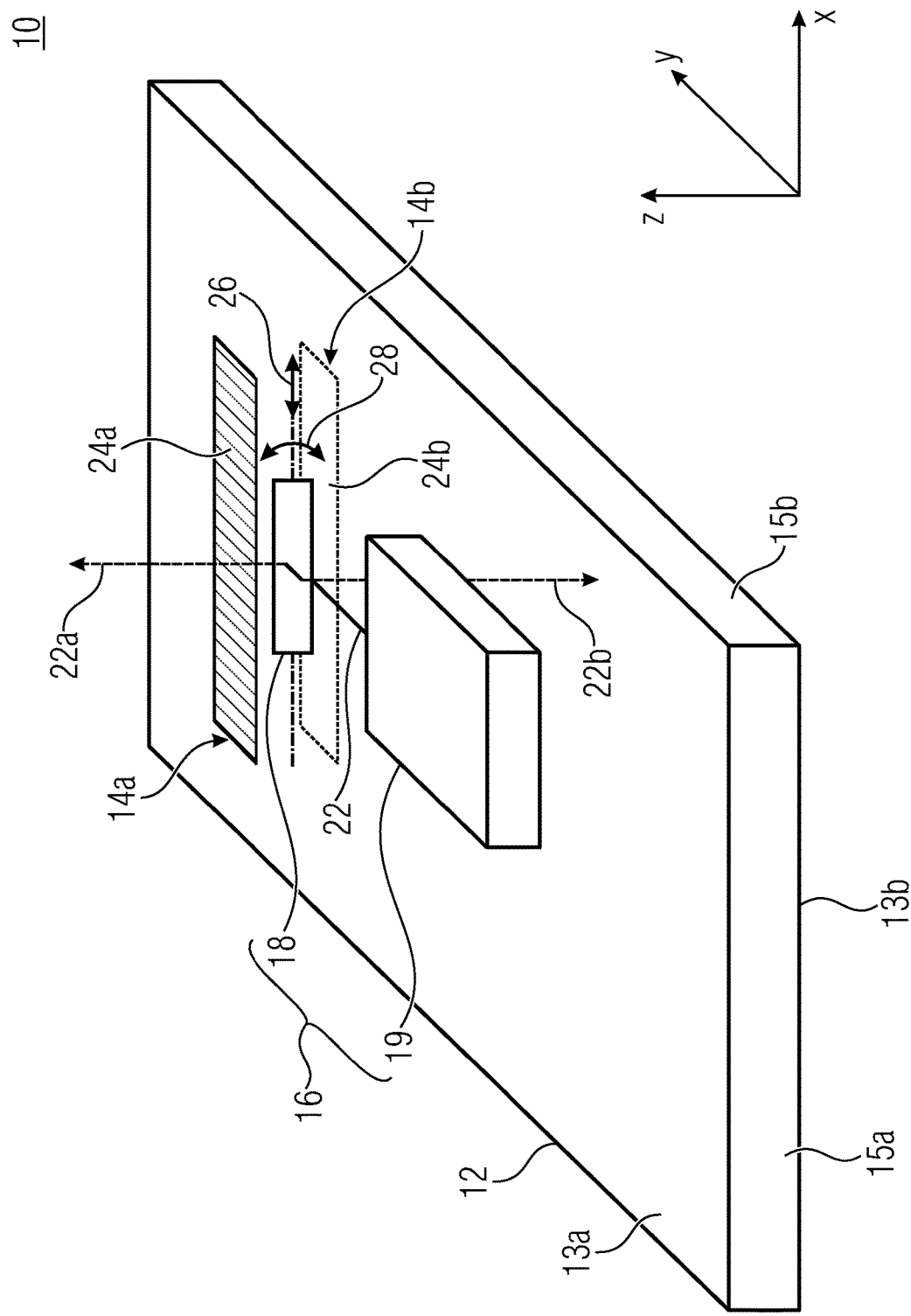
FIG. 1 shows a schematic perspective view of a device in accordance with an embodiment.

Before embodiments of the present invention will be explained in more detail below with reference to the drawings, it shall be noted that elements, objects and/or structures which are identical and have identical functions or actions will be provided with identical reference numerals in the various figures, so that the descriptions, presented in different embodiments, of said elements are interchangeable and/or mutually applicable.

Subsequent embodiments relate to the use of different wavelength ranges for imaging on an image sensor. The wavelength range relates to electromagnetic radiation, in particular to light. For example, an example for different wavelength ranges is the use of visible light, e.g., in a wavelength range of approximately 380 nm to approximately 650 nm. For example, a wavelength range different thereto may be an ultraviolet spectrum having wavelengths of less than 380 nm and/or an infrared spectrum having wavelengths of more than 700 nm, approximately 1000 nm to approximately 1000 µm, in particular a near-infrared spectrum having wavelengths in a range of approximately 700 nm or 780 nm up to approximately 3 µm. The first and the second wavelength range comprise at least partially different wavelengths. According to an embodiment, the wavelength ranges do not comprise any overlaps. According to an alternative embodiment, the wavelength ranges comprise an overlap, however, which is only partial, so that there are wavelengths in both ranges that enable a differentiation.

Subsequently described embodiments relate to beam-deflecting areas of a beam-deflecting means. A beam-deflecting area may a surface area or an area of an object that is configured to perform a deflection of an optical path in at least one wavelength range. This may be a sequence of at least one applied layer such as a dielectric layer, but also electrically conductive layers that provide or adjust a reflectivity. This may be an electrically passive or active property.

In subsequently described embodiments, reference will be made to main sides and secondary sides of a device. A main side of a device may be understood, in embodiments described herein, to be a side of a housing or of the device which has a large or a largest dimension as compared to other sides. For example, a first main side may designate a front side and a second main side may designate a rear side, even though this is not to have any limiting effect. Secondary sides may be understood to mean sides or faces which connect the main sides with one another.

Even though embodiments described below relate to portable devices, the aspects set forth may readily be transferred to other mobile or immobile devices. It is understood that the described portable devices may be installed in other devices, e.g., in vehicles. Moreover, a housing of a device may be configured to be non-portable. This is why the embodiments described below are not intended to be limited to portable devices but may refer to any implementation of a device.

FIG. 1 shows a schematic perspective view of a portable device 10 in accordance with an embodiment. The portable device 10 includes a housing 12 comprising a first transparent area 14a and a second transparent area 14b. For example, the housing 12 may be formed of an opaque plastic, a metal or the like. The transparent areas 14a and/or 14b may be integrally formed with the housing 12 or be formed in a multi-part manner. The transparent areas 14a and/or 14b may be recesses in the housing 12, for example. Alternatively, a transparent material may be arranged in an area of the recesses or of the transparent areas 14a and/or 14b. Transparent materials of the transparent areas 14a and/or 14b may be transparent at least within such a wavelength range of an electromagnetic radiation to which an imaging device, in particular a multi-aperture imaging device 16, or an image sensor of same, is receptive. This means that the transparent areas 14a and/or 14b may be configured to be partly or fully opaque in wavelength ranges different from the former. For example, the imaging device 16 may be configured to capture a first and a second wavelength range, such as a visible wavelength range, and to capture a wavelength range that at least partially differs therefrom.

The imaging device or multi-aperture imaging device 16 is disposed inside the housing 12. The imaging device 16 includes beam-deflecting means 18 and image capturing means 19. The image capturing means 19 may include two or more optical channels, each of which comprises one or more optics for changing (e.g., concentrating, focusing or scattering) an optical path of the imaging device 16, and an image sensor. Optics may be disjunctive, or undivided or channel-individual, with respect to different optical channels. Alternatively, it is also possible for the optics to comprise elements that together function for two, several, or all optical channels, such as a convergent lens, a mutual filter or the like combined with a channel-individual lens.

For example, the image capturing means 19 may comprise one or more image sensors whose assigned optical paths are directed through one or more optical channels onto the beam-deflecting means 18 and are deflected by the latter. As is described in the context of FIG. 6*a*, the at least two optical channels may be deflected such that they will capture mutually overlapping partial fields of view (partial object areas) of a total field of view (total object area). The imaging device 16 may be referred to as a multi-aperture imaging device. Each image sensor area of the image sensor may be assigned to an optical channel. A structural gap may be arranged between adjacent image sensor areas, or the image sensor areas may be implemented as different image sensors or parts thereof, however, alternatively or additionally, it is also possible that adjacent image sensor areas directly border on each other and are separated from each other through the readout of the image sensor.

The portable device 10 has a first operating state and a second operating state. The operating state may be correlated with a location, position or orientation of the beam-deflecting means 18. This may influence which wavelength range is deflected by the beam-deflecting means 16, by using sides with a different effectiveness for the deflection. Alternatively or additionally, two different operating states may influence the direction into which the optical path is deflected. In the exemplary multi-aperture imaging device 16, there may be 4 operating states, for example, two for two different viewing directions and two for the different wavelength ranges. One reason for this is that the beam-deflecting means 16 comprises a first beam-deflecting area that is operative for the first wavelength range of electromagnetic radiation passing through the optical channel; and comprises a second beam-deflecting area that is operative for the second wavelength range of electromagnetic radiation passing through the optical channel, the second wavelength range being different from the first wavelength range.

With respect to the viewing directions, in the first operating state, the beam-deflecting means 18 may deflect the optical path 22 of the imaging device 16 such that said optical path passes through the first transparent area 14*a*, as indicated by the optical path 22*a*. In the second operating state, the beam-deflecting means 18 may be configured to deflect the optical path 22 of the imaging device 16 such that said optical path passes through the second transparent area 14*b*, as indicated by the optical path 22*b*. This may also be understood to mean that the beam-deflecting means 18 directs the optical path 22 through one of the transparent areas 14*a* and/or 14*b* at one point in time and on the basis of the operating state. On the basis of the operating state, a position of a field of view (object area) captured by the imaging device 16 may be arranged in a manner varying in space.

The first beam-deflecting area that is operative for the first wavelength range and the second beam-deflecting area that is operative for the second wavelength range may be used alternately in order to deflect the optical paths of the optical channels, or the optical path 22. This enables directing towards the image sensor the part of the spectrum for which the beam-deflecting area is operative. For example, the beam-deflecting area may comprise a band pass functionality and may deflect, i.e. reflect, the wavelength ranges the band pass functionality is configured for, while other wavelength ranges are suppressed, filtered out or at least strongly attenuated, e.g. by at least 20 dB, at least 40 dB or at least 60 dB.

The beam-deflecting areas may be arranged on a same side of the beam-deflecting means 18, offering advantages with beam-deflecting means that may be translationally displaced.

Alternatively or additionally, different beam-deflecting areas may also be arranged at different sides of the beam-deflecting means 18, wherein said areas may face the image sensor alternately based on a rotational movement of the beam-deflecting means 18. In this case, any tilt angle may be used. However, when using two possibly opposite viewing directions of the multi-aperture imaging device 16, it is advantageous to select an angle of approximately 45° so that a rotational movement of 90° is sufficient to change the viewing direction. On the other hand, with only one viewing direction, a further degree of freedom may be selected.

Through alternately turning different beam-deflecting areas to face, the total field of view of the respective viewing direction may be captured with different wavelength ranges, due to the fact that the multi-aperture imaging device is configured to capture with the image sensor a first capturing of the total field of view using the first beam-deflecting area so that the first capturing is based on the first wavelength range; and to capture with the image sensor a second capturing of the total field of view using the second beam-deflecting area so that the second capturing is based on the second wavelength range. Thus, for example, a wavelength range that is not visible for the human eye may be used to obtain additional image information such as depth maps.

The portable device 10 may include a first diaphragm 24*a* and a second diaphragm 24*b*. The diaphragm 24*a* is arranged in an area of the transparent area 14*a* and is configured to at least partly optically close the transparent area 14*a* when the diaphragm 24*a* is in a closed state. In accordance with an embodiment, the diaphragm 24*a* is configured to close the transparent area 14*a* fully or at least 50%, 90% or at least 99% of the surface area of the transparent area 14*a* when the diaphragm is in the closed state. The diaphragm 24*b* is configured to close the transparent area 14*b* in the same or a similar manner as described for the diaphragm 24*a* in the context of the transparent area 14*a*. In the first operating state, during which the beam-deflecting means 18 deflects the optical path 22 toward the optical path 22*a*, the diaphragm 24*b* may at least partly optically close the transparent area 14*b* so that stray light enters the housing 12 to a small extent or possibly not at all through the transparent area 14*b*. This enables a small impact on the capturing of the field of view in the first operating state by stray light entering the diaphragm 14*b*. In the second operating state, in which, e.g., the optical path 22*b* exits the housing 12, the diaphragm 24*a* may at least partly optically close the transparent area 14*a*. In simplified terms, the diaphragms 24*a* and/or 24*b* may be configured such that they close transparent areas 14*a* and/or 14*b* such that stray light enters to a small extent, or does not enter at all, through them from undesired directions (in which, e.g., the captured field of view is not located). The diaphragms 24a and/or 24b may be configured to be continuous and may be arranged in each case in relation to all of the optical channels of the imaging device 16. This means that on the basis of the respective operating state, the diaphragms 24a and 24b may be used by any of the optical channels of the multi-aperture imaging device. In accordance with an embodiment, one diaphragm 24a or 24b, which is used by all of the optical channels, is arranged rather than individual round diaphragms being arranged for each optical channel. The diaphragms 24a and/or 24b may have, e.g., rectangular, oval, round or elliptical shapes, in line with a polygon chain.

Switching between the first and second operating states may include, e.g., a movement of the beam-deflecting means 18 on the basis of a translational movement 26 and/or on the basis of a rotational movement 28.

The diaphragms 24a and/or 24b may be configured as mechanical diaphragms, for example. Alternatively, the diaphragms 24a and/or 24b may be configured as electrochromic diaphragms. This enables using a small number of mechanically moveable parts. Moreover, configuring the diaphragms 24a and/or 24b as electrochromic diaphragms enables noiseless opening and/or closing of the transparent areas 14a and/or 14b as well as an implementation that can be readily integrated into an optic of the portable device 10. For example, the diaphragms 24a and/or 24b may be configured such that they are hardly or not at all perceived by a user when they are in a closed state since there are few optical differences as compared to the housing 12.

The housing 12 may be configured to be flat. For example, the main sides 13a and/or 13b may be spatially arranged within an x/y plane or a plane parallel thereto. Secondary sides or secondary faces 15a and/or 15b located between the main sides 13a and 13b may be spatially arranged such that they are oblique or perpendicular thereto, it being possible for the main sides 13a and/or 13b and/or the secondary sides 15a and/or 15b to be configured to be curved or planar. An extension of the housing 12 along a first housing direction z between the main sides 13a and 13b, for example in a manner that is parallel or anti-parallel to a surface normal of a display of the portable device 10, may be small as compared to further dimensions of the housing 12 along further extensions, i.e., along an extension direction of the main side 13a and/or 13b. The secondary sides 15a and 15b may be parallel or anti-parallel to the surface normal of a display. The main sides 13a and/or 13b may be spatially arranged perpendicularly to a surface normal of a display of the portable device 10. Thus, for example, an extension of the housing along the x direction and/or along the y direction may be at least three times, at least five times or at least seven times an extension of the housing 12 along the first extension z. In simplified terms, however without having any limiting effect, the extension of the housing z may be understood to be the thickness or depth of the housing 12.

Figure 2:
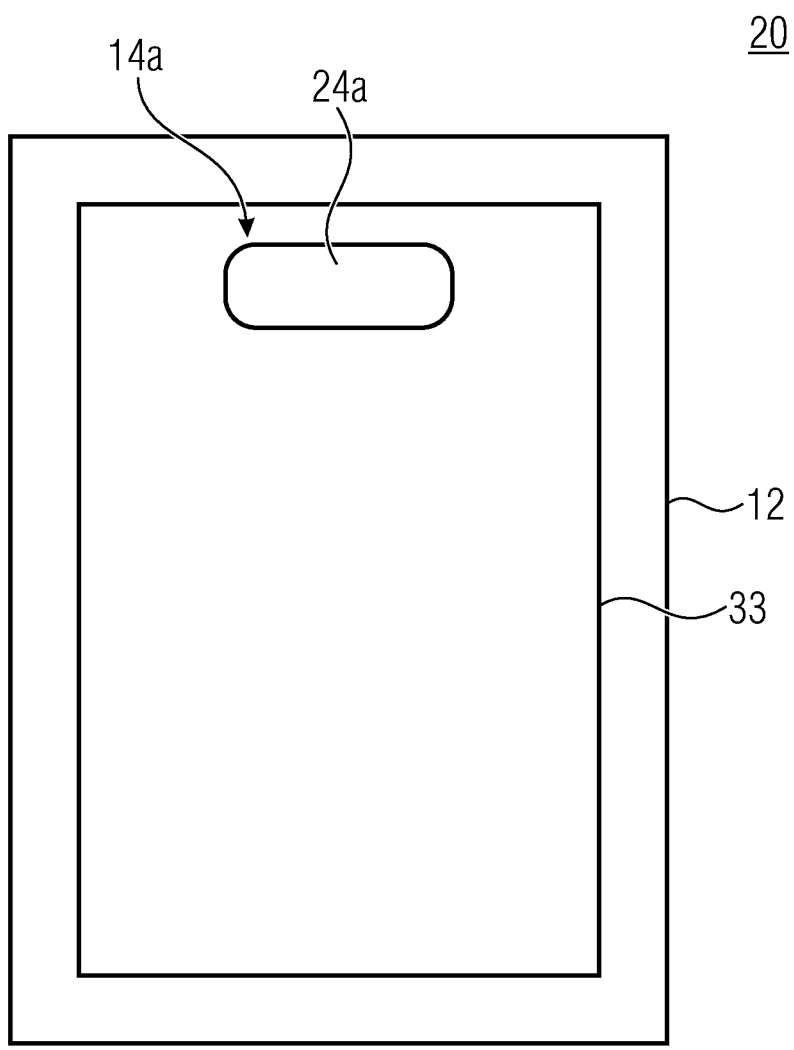
FIG. 2 shows a schematic view of a main side of a device in accordance with a further embodiment.

FIG. 2 shows a schematic view of a main side of a portable device 20 in accordance with an embodiment. The portable device may include the device 10. The portable device 20 may include a display 33, for example a screen. For example, the device 20 may be a portable communication device such as a mobile phone (smartphone), a tablet computer, a mobile music player, a monitor or a visual display unit, which comprises the imaging device 16. The transparent area 14a and/or the transparent area 14b may be arranged in an area of the housing 12 within which the display 33 is arranged. This means that the diaphragm 24a and/or 24b may be arranged in an area of the display 33. For example, the transparent area 14a and/or 14b and/or the diaphragm 24a and/or 24b may be concealed by the display 33. In an area of the display 33 in which the diaphragm 24a and/or 24b is arranged, information of the display may be presentable at least periodically. Said presentation of the information may be any operation of the portable device 20. For example, a view-finder function may be presentable on the display 33 wherein a field of view may be presented which is scanned or captured by the imaging device inside the housing 12. Alternatively or additionally, images which have already been captured or any other information may be presentable. In simple words, the transparent area 14a and/or the diaphragm 24a may be concealed by the display 33, so that the transparent area 14a and/or the diaphragm 24a can hardly be perceived or cannot be perceived during operation of the portable device 20.

The transparent areas 14a and 14b may each be arranged in at least one main side 13a of the housing 12 and/or in an opposite main side. In simple words, the housing 12 may have a transparent area at the front and a transparent area at the back. In this context it shall be noted that the terms front and back may be randomly replaced by other terms such as left and right, top and bottom or the like, for example, without limiting any of the embodiments described herein. In accordance with further embodiments, the transparent areas 14a and/or 14b may be arranged in a secondary side. Arranging of the transparent areas may be arbitrary and/or be dependent on directions into which the optical paths of the optical channels are deflectable.

In the area of the transparent area 14a or of the diaphragm 24a, the display 33 may be configured, for example, to be periodically deactivated while an image is being captured by means of the imaging device, or to increase transparency of the display 33 beyond the housing 12. Alternatively, the display 33 may also remain active in this area, for example when the display 33 emits no or hardly any electromagnetic radiation in a relevant wavelength range into the interior of the portable device 20 and/or of the housing 12 or toward the imaging device 16.

Figure 3A:
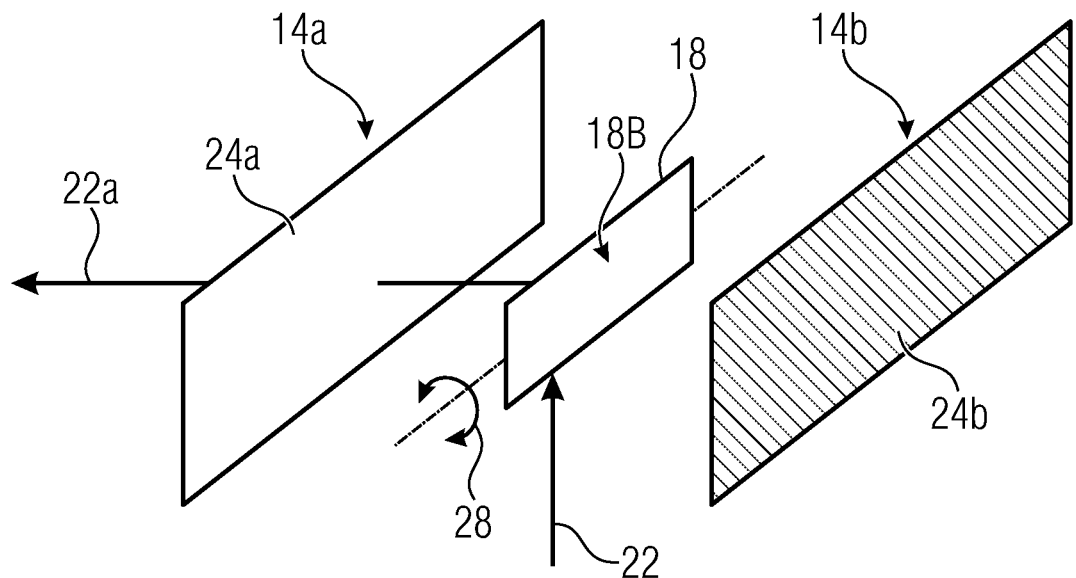
FIG. 3a shows a beam-deflecting means and a state of diaphragms in a first operating state in accordance with an embodiment.

FIG. 3a shows the beam-deflecting means 18 and a state of the multi-aperture imaging device, e.g., accompanying an operating state of the first diaphragm 24a as well as of the second diaphragm 24b. E.g., the beam-deflecting means 18 deflects the optical path 22 with a beam-deflecting area 18A shown in FIG. 3b such that same passes through the transparent area 14a as the optical path 22a. The diaphragm 24b may periodically at least partly close the transparent area 14b, so that stay light does not enter, or enters to a small extent only, the interior of the housing of the portable device through the transparent area 14b.

Figure 3B:
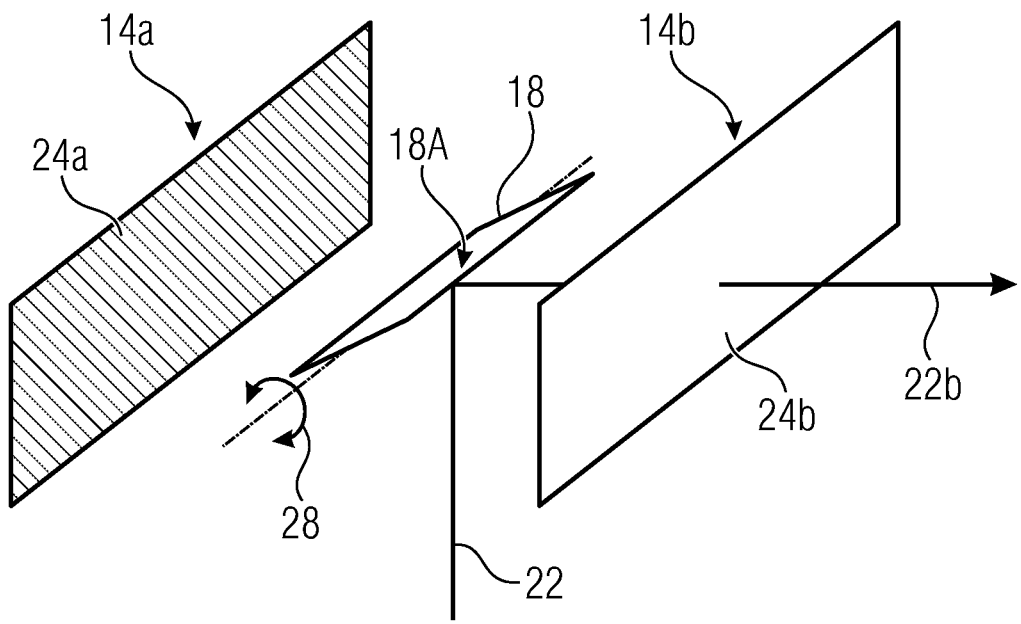
FIG. 3b shows the beam-deflecting means and the diaphragms in a second operating state.

FIG. 3b shows the beam-deflecting means 18, the diaphragm 24a and the diaphragm 24b in a second operating state, e.g., wherein the beam-deflecting means 18 comprises a different viewing direction using the rotational movement 28 by 90°. However, the beam-deflecting means now deflects the optical path with a beam-deflecting area 18B that is operative for the second wavelength range, so that capturing a total field of view arranged in the viewing direction of the optical path 22b may be carried out in the range of the second wavelength range.

When the beam-deflecting means rotates around 90° more and therefore around 180° as compared to the original state, the first viewing direction illustrated in FIG. 3a would again be adopted, however, under the influence of the beam-deflecting area 188. Although capturing only one total field of view is possible, e.g., by the viewing direction 22a or 22b being provided using an arbitrary angle, a higher number of total fields of view may therefore be captured, e.g. 2, 3, or more.

The beam-deflecting means 18 may deflect the optical path 22 such that same passes through the transparent area 14b as the optical path 22b while the diaphragm 24a at least partly optically closes the transparent area 14a. In the second operating state, the diaphragm 24b may exhibit an at least partly or fully opened state. The opened state may relate to a transparency of the diaphragm. For example, an electrochromic diaphragm may be referred to as being opened or closed as a function of a control state, without mechanical components being moved. During the second operating state, a diaphragm 24b configured as an electrochromic diaphragm may be at least periodically partly or fully transparent to a wavelength range to be detected by the imaging device. In the first operating state as depicted in FIG. 3a, the diaphragm 24b may be partly or fully untransparent or opaque to this wavelength range. Switching between the first operating state of FIG. 3a and the second operating state of FIG. 3b may be obtained on the basis of the rotational movement 28 of the deflecting means 18 and/or on the basis of a translational movement, as described in the context of FIGS. 4a and 4b, or may include at least one of said movements.

Figure 4A:
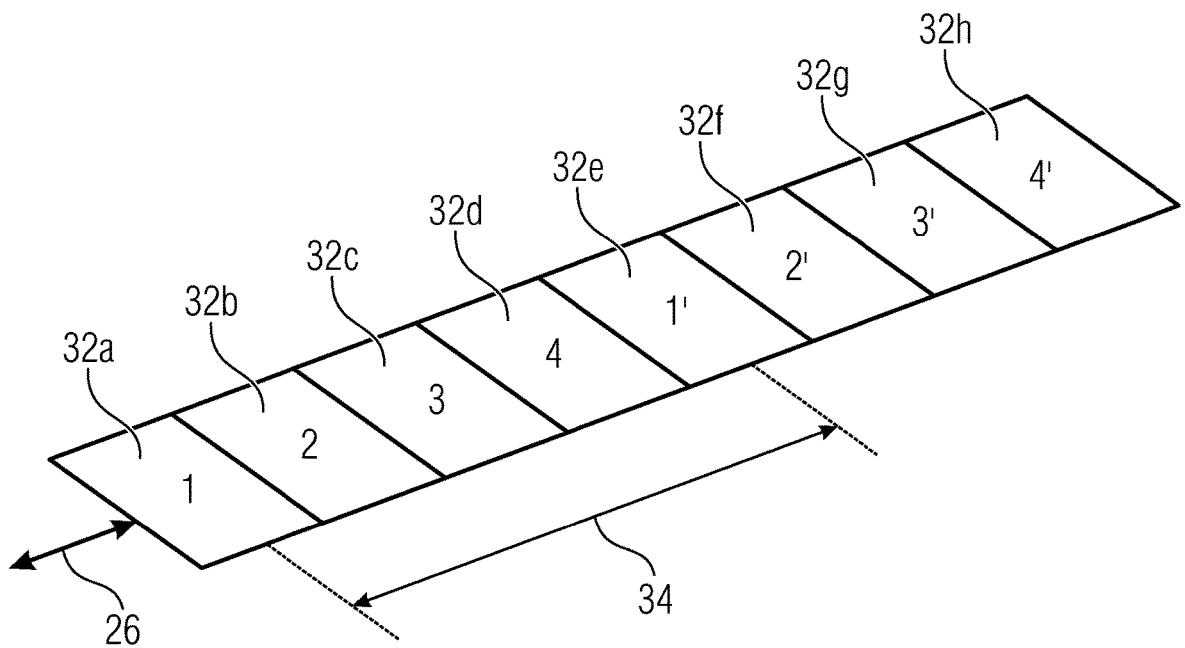
FIG. 4a shows a schematic view of the beam-deflecting means in accordance with an embodiment, said beam-deflecting means including a plurality of beam-deflecting areas.

FIG. 4a shows a schematic view of the beam-deflecting means 18, which includes a multitude of beam-deflecting elements 32a-h. For example, the imaging device may include a plurality or a multitude of optical channels, e.g., two, four or a larger number. For example, if the imaging device comprises four optical channels, the beam-deflecting means 18 may include a number of beam-deflecting elements 32a-h in accordance with a number of the optical channels multiplied by a number of operating states between which the beam-deflecting means 18 or the portable device can be switched. For example, the beam-deflecting elements 32a and 32e may by associated with a first optical channel, the beam-deflecting element 32a deflecting the optical path of the first optical channel in the first operating state, and the beam-deflecting element 32e deflecting the optical path of the first optical channel in the first operating state. Similarly, the beam-deflecting elements 32b and 32f, 32c and 32g, and 32d and 32h, respectively, may be associated with further optical channels.

The beam-deflecting means may be translationally moveable along the translational direction of movement 26 and/or may be moveable to and fro between a first position and a second position of the beam-deflecting means 18 with regard to the optical channels of the imaging device so as to change between the first operating state and the second operating state. A distance 34 across which the beam-deflecting means 18 is moved between the first position and the second position may correspond at least to a distance between four optical channels of the imaging device. The beam-deflecting means 18 may comprise block-by-block sorting of the beam-deflecting elements 32a-h. For example, the beam-deflecting elements 32a-d may be configured to deflect the optical paths of the imaging device into a first viewing direction toward a first field of view, it being possible for each optical channel to be associated with a partial field of view of the total field of view. The beam-deflecting elements 32e-h may be configured to deflect the optical paths of the imaging device into a second viewing direction toward a second field of view, it being possible for each optical channel to be associated with a partial field of view of the total field of view. In accordance with further embodiments, it is possible for optical paths of at least two optical channels to be deflected by a beam-deflecting element, so that a number of beam-deflecting elements of the beam-deflecting means 18 may be smaller.

The beam-deflecting elements 32a-h may be areas of the beam deflection means 18 which have mutually different curvatures, or they may be planar facets of a facet mirror. For example, the beam-deflecting means 18 may be understood to be an array of facets and/or deflection elements 32a-h exhibiting mutually different inclinations, so that optical paths of optical channels which impinge on the beam-deflecting means 18 are directed into mutually different partial fields of view of the field of view of the first operating state, and that optical paths which impinge on deflection elements 32e-h and are deflected by same are directed into mutually different partial fields of view of a field of view of the second operating state.

Figure 4B:
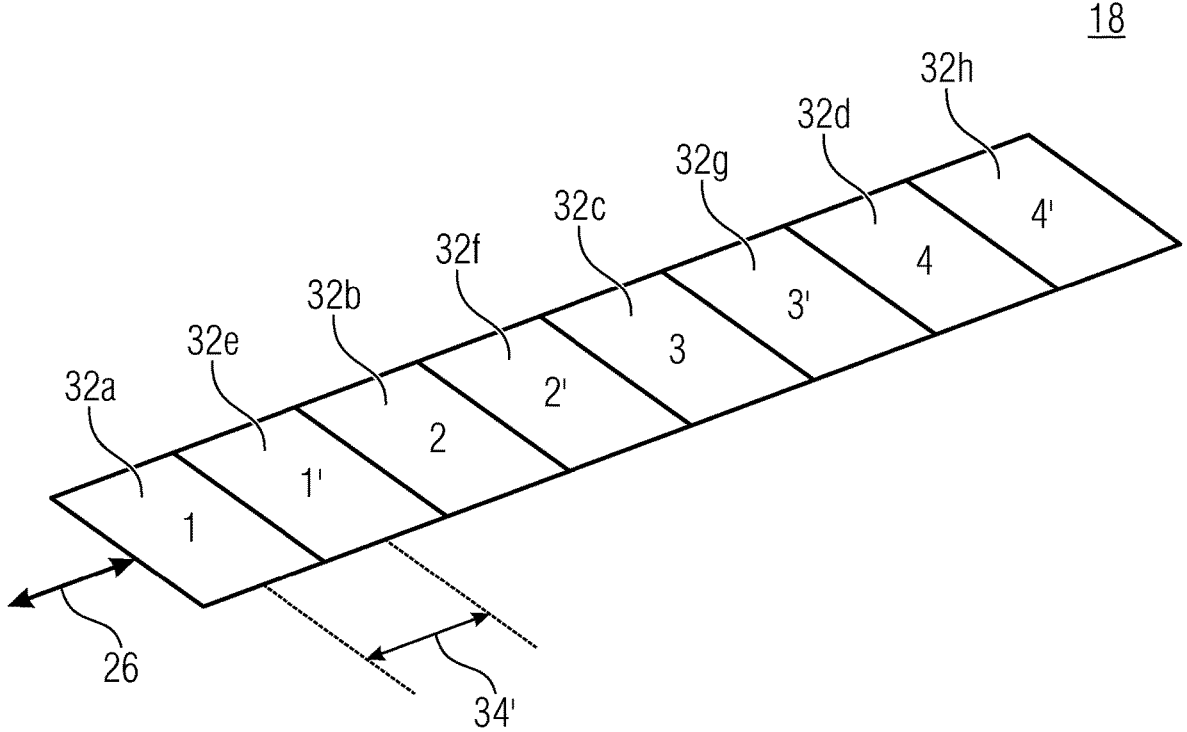
FIG. 4b shows a schematic view of the beam-deflecting means in accordance with a configuration that is an alternative to FIG. 4a, and in accordance with an embodiment.

FIG. 4b shows a schematic view of the beam-deflecting means 18 in accordance with a configuration different from the configuration of FIG. 4a. While the configuration of FIG. 4a may be understood to be block-by-block sorting of the beam-deflecting elements 32a-h on the basis of an operating state, the configuration of FIG. 4b may be understood to be channel-by-channel sorting of the beam-deflecting elements 32a-h on the basis of a sequence of the optical channels of the imaging device. The beam-deflecting elements 32a and 32e which are associated with the first optical channel may be arranged adjacently to each other. By analogy, the beam-deflecting elements 32b and 32f, 32c and 32g, and 32d and 32h, respectively, which may be associated with the optical channels 2, 3 and 4, respectively, may be arranged adjacently to each another. For example, if the optical channels of the imaging device have a sufficiently large distance to one another, a distance 34' across which the beam-deflecting means 18 is moved so as to be moved to and fro between the first position and the second position may be smaller than the distance 34, for example it may be a quarter or half thereof. This enables a further reduced structural design of the imaging device and/or of the portable device.

Instead of solely assigning the beam-deflecting elements to optical channels, they may each also provide beam-deflecting areas of different types so that a first optical channel is deflected, e.g., either by deflecting with the beam-deflecting element 32a in the first wavelength range or by deflecting with the beam-deflecting element 32e in the second wavelength range.

The rotational movement may be combined with the translational movement. Thus, e.g., it is conceivable that a translational movement switches between the wavelength ranges, i.e. the different beam-deflecting elements 32a-h are arranged at a mutual side of the beam-deflecting means 18, wherein an implementation that is reflective on both sides enables switching the viewing direction, and vice versa.

By means of FIGS. 4c-h, advantageous implementations of the beam-deflecting means 18 will be described. The explanations will illustrate a number of advantages which can be implemented individually or in any combination but are not intended to be limiting.

Figure 4C:
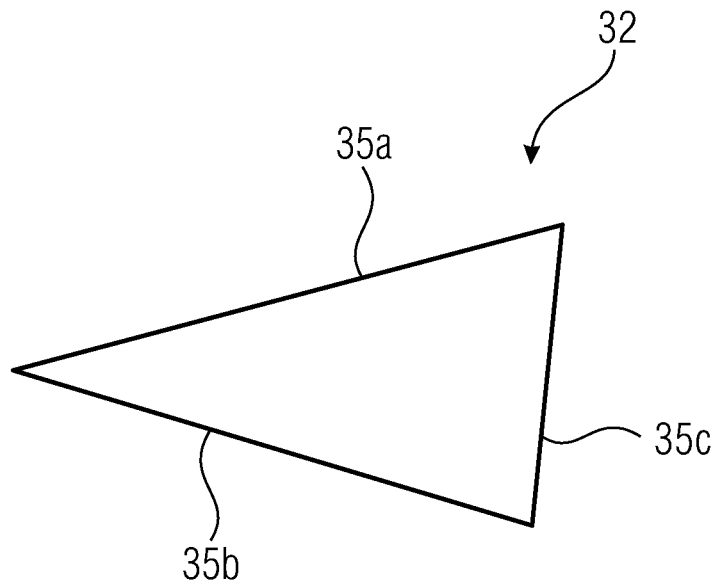
FIGS. 4c-h show advantageous implementations of a beam-deflecting means of an imaging device in accordance with an embodiment.

FIG. 4c shows a schematic sectional side view of a beam-deflecting element 32 as may be employed for a beam-deflecting means described herein, e.g., the beam-deflecting means 18 of FIG. 4a or 4b. The beam-deflecting element 32 may have across section in the manner of a polygon chain. Even though a triangular cross section is shown, any other polygon is also possible. Alternatively or additionally, the cross section may also comprise at least one curved surface; in particular with reflecting surfaces, a configuration which is planar at least in sections may be advantageous so as to avoid aberrations. Beam-deflecting areas operating differently with respect to wavelengths may be arranged at different and opposite main sides 35a and 35b.

For example, the beam-deflecting element 32 comprises a first side 35a, a second side 35b and a third side 35c. At least two sides, e.g. sides 35a and 35b, are configured to be reflective, so that the beam-deflecting element 32 is configured to be reflective on both sides. The sides 35a and 35b may be main sides of the beam-deflecting element 32, i.e., sides whose surface areas are larger than that of side 35c.

Figure 4D:
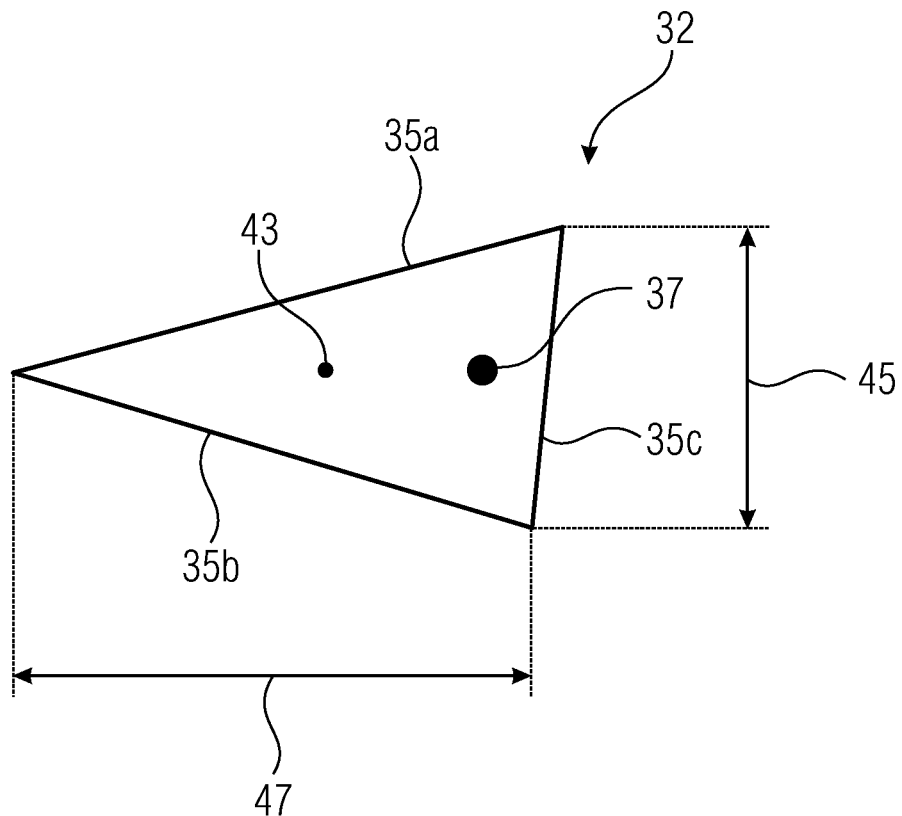

In other words, the beam-deflecting element 32 may have the shape of a wedge and be formed to be reflective on both sides. A further face which, however, is considerably smaller than the face 35c, may be arranged opposite the face 35c, i.e., between the faces 35a and 35b. In other words, in such a case the wedge formed by the faces 35a, 35b and 35c does not taper arbitrarily but is provided with a face on the pointed side and is therefore truncated. FIG. 4d shows a schematic sectional side view of the beam-deflecting element 32, wherein a suspension or a displacement axis 37 of the beam-deflecting element 32 is described. The displacement axis 37 about which the beam-deflecting element 32 may be rotationally and/or translationally moveable in the beam-deflecting means 18 may be eccentrically displaced with regard to a centroid 43 of the cross section. The centroid may alternatively also be a point which describes half the dimension of the beam-deflecting element 32 along a thickness direction 45 and along a direction 47 perpendicular thereto.

The displacement axis may be unchanged, e.g., along a thickness direction 45 and may have any offset in a direction perpendicular thereto. Alternatively, an offset along the thickness direction 45 is also conceivable. The displacement may be effected, e.g., such that upon rotation of the beam-deflecting element 32 about the displacement axis 37, a travel range is obtained which is larger than that obtained upon rotation about the centroid 43. Thus, the travel by which the edge between the sides 35a and 35b is moved upon rotation may increase, due to the displacement of the displacement axis 37, as compared to a rotation about the centroid 43, given an identical angle of rotation. Advantageously, the beam-deflecting element 32 is arranged such that the edge, i.e., the pointed side of the wedge-shaped cross section, located between the sides 35a and 35b faces the image sensor. Thus, a respectively other side 35a or 35b may deflect the optical path of the optical channels by means of small rotational movements. This shows that the rotation may be performed such that a space requirement of the beam-deflecting means along the thickness direction 45 is small since a movement of the beam-deflecting element 32 such that a main side will be perpendicular to the image sensor is not required.

The side 35c may also be referred to as a secondary side or as a rear side. Several beam-deflecting elements may be connected to one another such that a connecting element is arranged on the side 35c or extends through the cross section of the beam-deflecting elements, i.e., is arranged inside the beam-deflecting elements, for example in the area of the displacement axis 37. In particular, the holding element may be arranged to not project, or to project to a small extent only, i.e., by a maximum of 50%, by a maximum of 30% or by a maximum of 10%, beyond the beam-deflecting element 32 along the direction 45, so that the holding element does not increase or determine the extension of the overall design along the direction 45. Alternatively, the extension in the thickness direction 45 may be determined by the lenses of the optical channels, i.e., said lenses have the dimension defining the minimum thickness.

The beam-deflecting element 32 may be formed from glass, ceramics, glass ceramic, plastic, metal or any combination of said materials and/or of further materials.

In other words, the beam-deflecting element 32 may be arranged such that the tip, i.e. the edge located between the main sides 35a and 35b, points toward the image sensor. Retention of the beam-deflecting elements may be effected such that it occurs only on the rear side of, or inside, the beam-deflecting elements, i.e. the main sides are not concealed. A shared holding or connecting element may extend across the rear side 35c. The axis of rotation of the beam-deflecting element 32 may be arranged eccentrically.

Figure 4E:
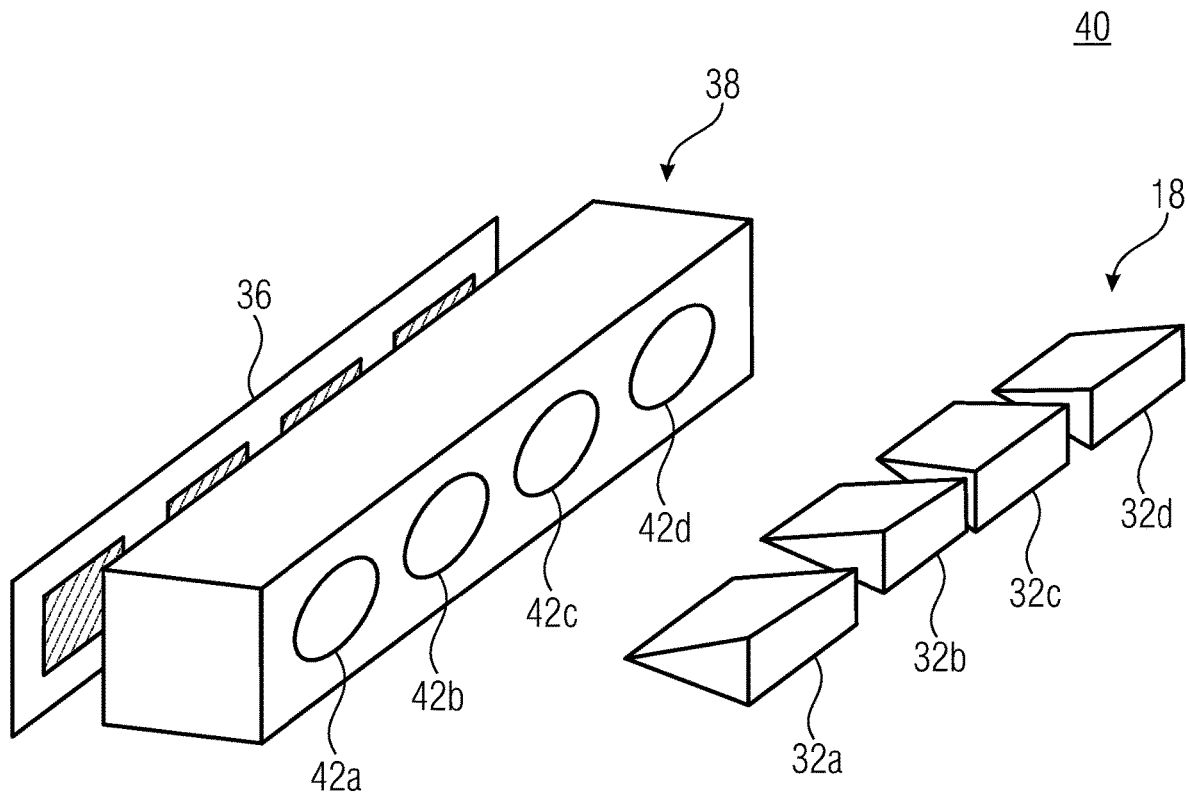
Figure 4E:
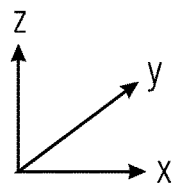

FIG. 4e shows a schematic perspective view of a multi-aperture imaging device 40 including an image sensor 36 and a one-line array 38 of adjacently arranged optical channels 42a-d. The beam-deflecting means 18 includes a number of beam-deflecting elements 32a-d which may correspond to the number of optical channels. Alternatively, a smaller number of beam-deflecting elements may be arranged, for example when at least one beam-deflecting element is used by two optical channels. Alternatively, a larger number may be arranged, such as when the deflection direction of the beam-deflecting means 18 is switched by a translational movement, as described in connection with FIGS. 4a and 4b. Each beam-deflecting element 32a-d may be associated with an optical channel 42a-d. The beam-deflecting elements 32a-d may be configured as a multitude of elements 32 in accordance with FIGS. 4c and 4d. Alternatively, at least two, several or all of the beam-deflecting elements 32a-d may be formed integrally with one another.

Figure 4F:
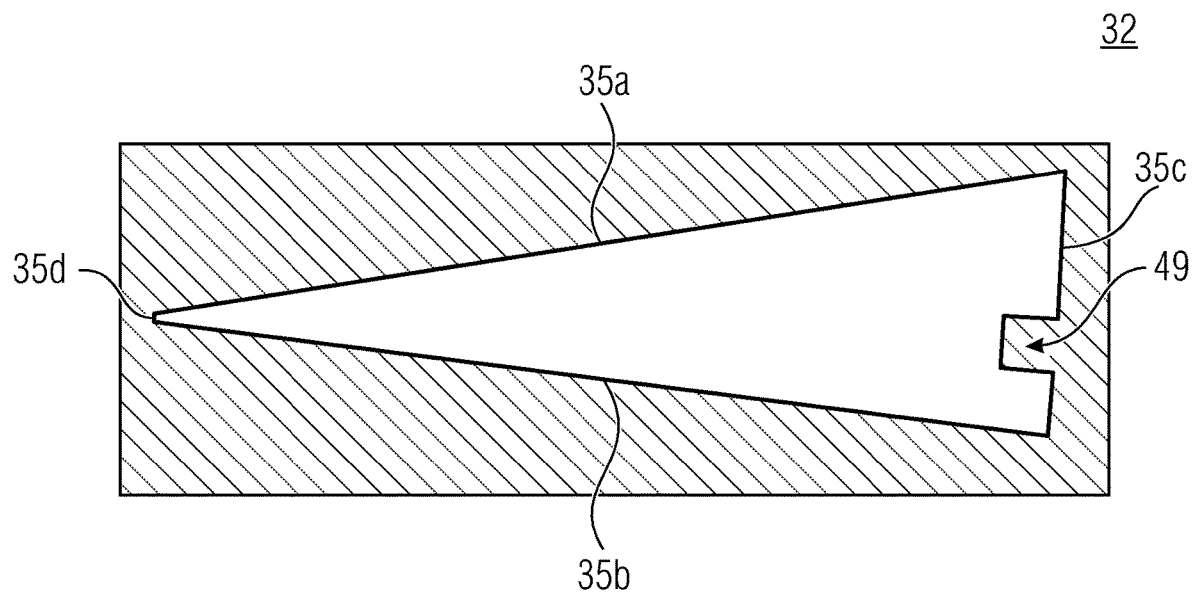

FIG. 4f shows a schematic sectional side view of the beam-deflecting element 32, the cross section of which is formed as a freeform surface. Thus, the side 35c may comprise a recess 49 enabling attachment of a holding element; the recess 49 may also be formed as a protruding element, such as a key of a slot-and-key system. The cross section further comprises a fourth side 35d which has a smaller surface area than the main sides 35a and 35b and connects same with each other.

Figure 4G:
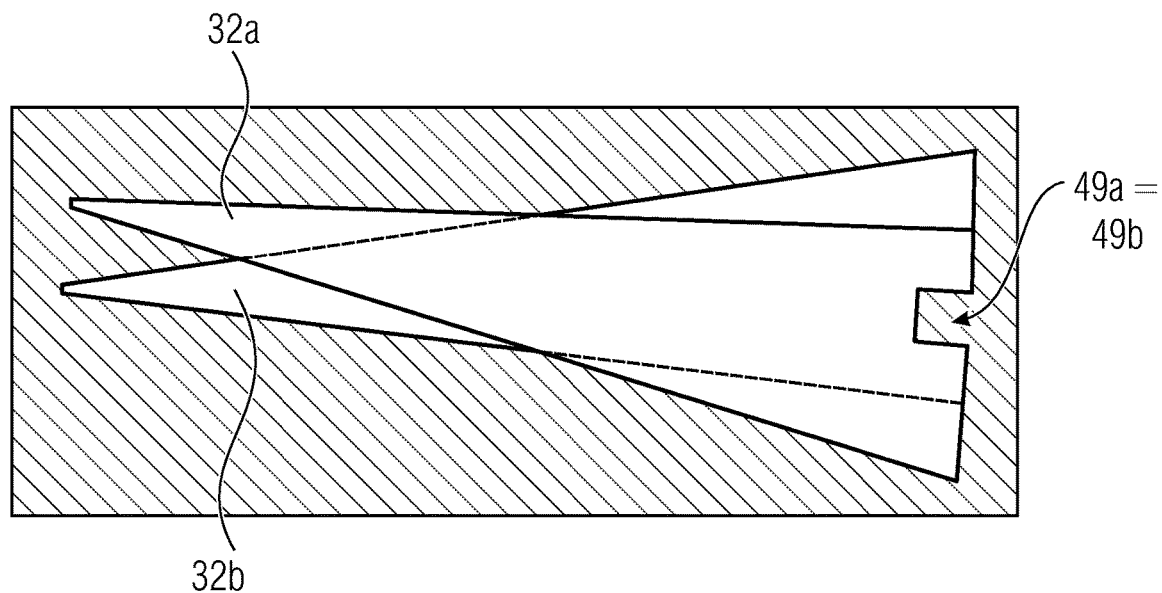

FIG. 4g shows a schematic sectional side view of a first beam-deflecting element 32a and of a second beam-deflecting element 32b, which is located behind the former as seen in the direction of presentation. The recesses 49a and 49b may be arranged to be essentially congruent, so that it is possible to arrange a connecting element in the recesses.

Figure 4H:
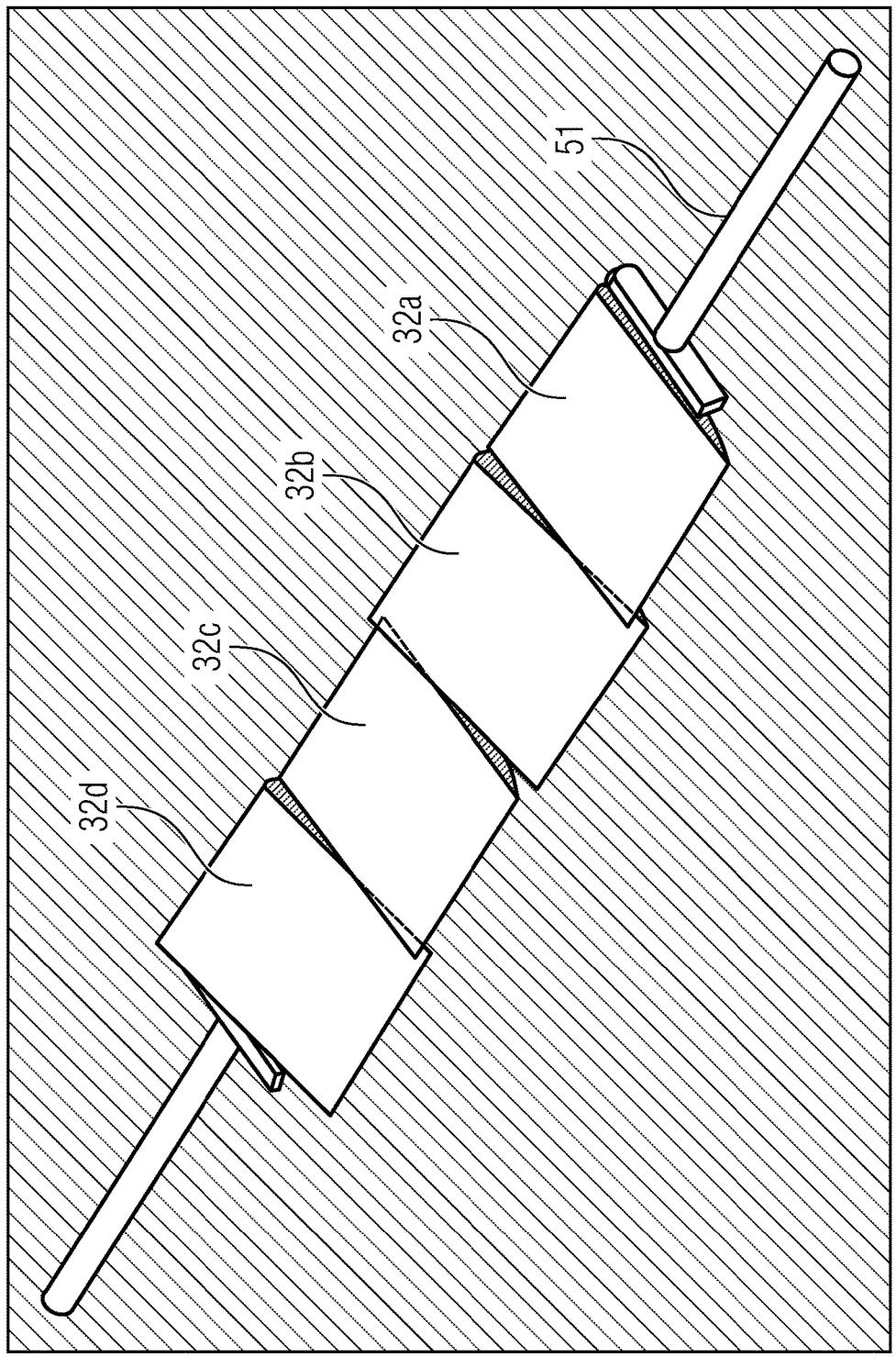

FIG. 4h shows a schematic perspective view of the beam-deflecting means 18 including, e.g., four beam-deflecting elements 32a-d which are connected to a connecting element 51. The connecting element may be used for being translationally and/or rotationally moveable by an actuator. The connecting element 51 may be integrally formed and may extend across an extension direction, e.g. the y direction in FIG. 4e, on or within the beam-deflecting elements 32a-d. Alternatively, the connecting element 51 may be coupled only to at least one side of the beam-deflecting means 18, for example when the beam-deflecting elements 32a-d are integrally formed. Alternatively, a connection to an actuator and/or a connection of the beam-deflecting elements 32a-d may also occur in any other way, for example by means of adhesion, wringing or soldering, for example.

Figure 5A:
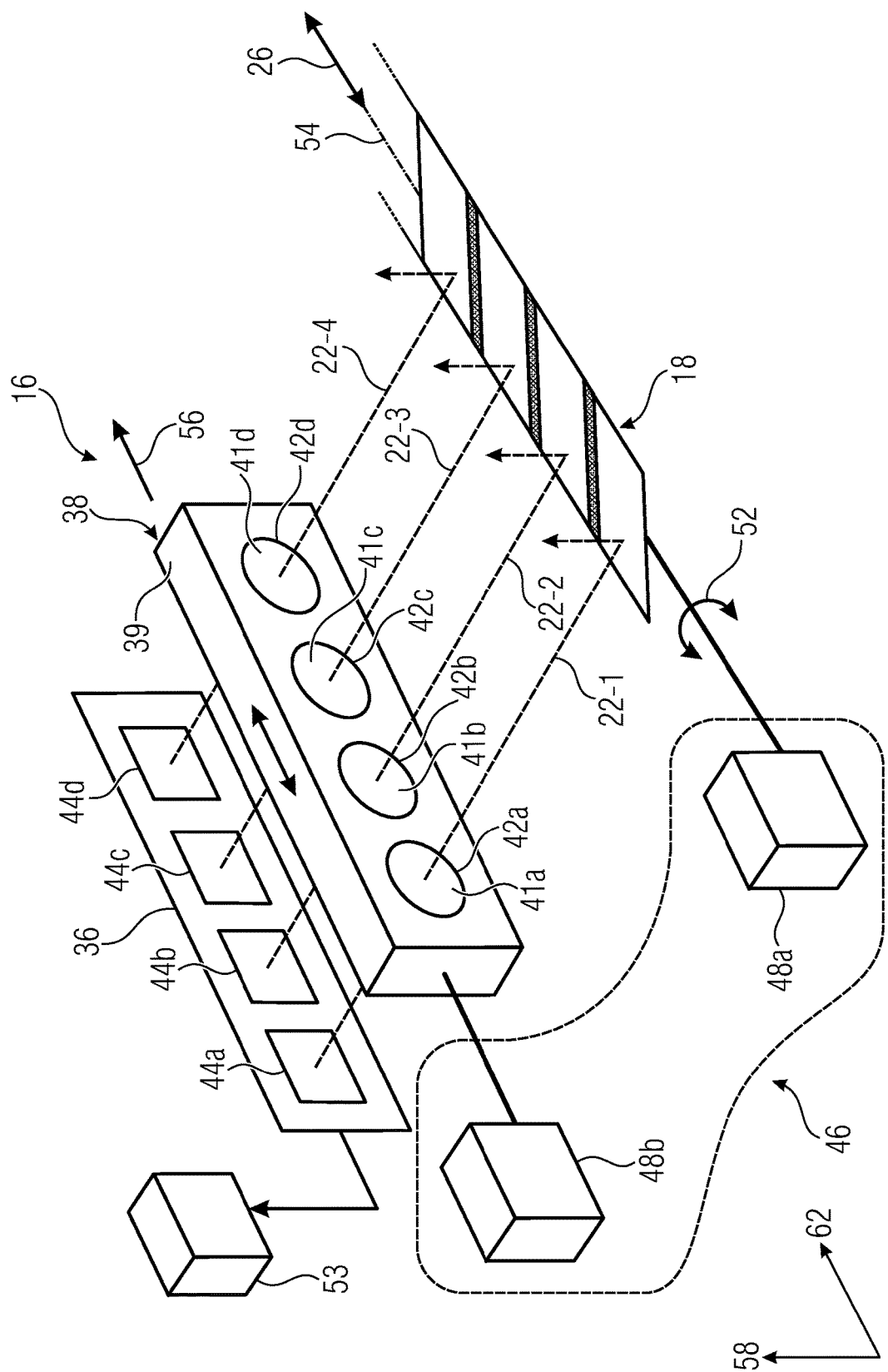
FIG. 5a shows a schematic perspective view of an imaging device in accordance with an embodiment.

FIG. 5a shows a schematic perspective view of the imaging device 16. The imaging device 16 includes the beam-deflecting means 18, an image sensor 36 and a one-line array 38 of adjacently arranged optical channels 42a-d. Each optical channel 42a-d may comprise an optic configured to optically influence optical paths 22-1 to 22-4 of the imaging device 16. The optic may be channel-individual or may comprise mutual components for groups of two or more optical channels.

The image sensor 36 may include image sensor areas 44a-d; the optical paths 22-1 to 22-4 of the optical channels 22a-d each may impinge upon an image sensor area 44a-d. In simplified terms, each image sensor area 44a-d may have an optical channel 22a-d and/or an optical path 22-1 to 22-4 associated therewith. The beam-deflecting means 18 may be configured to deflect the optical paths 22-1 to 22-4 into mutually different directions and/or different wavelengths on the basis of mutually different operating states of the portable device and/or of mutually different positions of the beam-deflecting means 18, as described, for example, in connection with FIGS. 1, 2, 3a, 3b, 4a-h. This means that the imaging device 16 may be formed as or include the multi-aperture imaging device 40.

The image sensor areas 44a-d may each be formed from a chip, for example, which includes a corresponding pixel array; the image sensor areas may be mounted on a shared substrate and/or a shared circuit board. Alternatively, it would also be possible, of course, for the image sensor areas 44a-d to each be formed from a part of a shared pixel array continually extending across the image sensor areas 44a-d, the shared pixel array being formed, e.g., on an individual chip. For example, only the pixel values of the shared pixel array will then be read out in the image sensor areas 44a-d. Various combinations of said alternatives are also possible, of course, such as the presence of one chip for two or more channels and of a further chip for yet other channels or the like. In the case of several chips of the image sensor 36, said chips may be mounted on one or more circuit boards, for example all together or in groups or the like.

The one-line array 38 may comprise a carrier 39 at which optics 41a-d of the optical channels are arranged. The carrier 39 may be passed through by the optical paths 22-1 to 22-4 used for imaging in the individual optical channels. The optical channels of the multi-aperture imaging device may traverse the carrier 39 between the beam-deflecting means 18 and an image sensor 36. The carrier 39 may maintain a relative position between the optics 41a-d in a stable manner. The carrier 39 may be transparently formed and include, e.g., a glass material and/or a polymer material. The optics 41a-d may be arranged on at least one surface of the carrier 39. This enables a small dimension of the carrier 39, and, therefore, of the one-line array 38 along a direction parallel to the image sensor 36 and perpendicular to the line extension direction 56 since enclosure of the optics 41a-d within a circumferential area of same may be dispensed with. In accordance with embodiments, the carrier 39 is not configured to be larger, or is configured to be only marginally larger, i.e. by a maximum of 20%, by a maximum of 10% or by a maximum of 5%, than a corresponding dimension of the optic 41a-d along the direction that is parallel to a main side of the image sensor 36 and perpendicular to the line extension direction 56.

The beam-deflecting means may be configured such that in the first positon and in the second position, it deflects the optical path 22-1 to 22-4 of each optical channel 42a-d in mutually different directions. This means that the deflected optical paths 22-1 to 22-4 may have mutual angles, as described in the context of FIG. 6a. The optical channels 16a-d may be arranged in at least one line along a line extension direction 56. The array 38 may be formed as a multi-line array including at least two lines or as a one-line array including (exactly) one line of optical channels. The optical channels may be directed by the beam-deflecting means 18 on the basis of a viewing direction set toward varying fields of view. The optical channels may have angles in relation to one another within a viewing direction, so that the optical channels are directed into partial fields of view of the total field of view which only partly overlap, if they overlap at all. The different angles of the optical channels may be obtained on the basis of the optics of the optical channels and/or on the basis of mutually different deflections of the optical channels at the beam-deflecting means 18. The imaging device 16 may include an actuator 48a, e.g., which is part of an optical image stabilizer 46a and/or may be used for switching the position of the beam-deflecting means 18. The optical image stabilizer 46 may be configured to enable optical image stabilization of an image captured by the image sensor 36. To this end, the actuator 48a may be configured to produce a rotational movement 52 of the beam-deflecting means 18. The rotational movement 52 may occur about a rotational axis 54; the rotational axis 54 of the beam-deflecting means 18 may be arranged in a central area of the beam-deflecting means 18 or at a distance therefrom. The rotational movement 52 may be superimposed upon the rotational movement 28 and/or the translational movement 26 for switching the beam-deflecting means between first and second positions or operating states. If the beam-deflecting means 18 is translationally moveable, the translational movement 26 may be spatially arranged in parallel with a line extension direction 56 of the one-line array 38. The line extension direction 56 may relate to a direction along which the optical channels 42a-d are adjacently arranged. On the basis of the rotational movement 52, an optical image stabilization may be obtained along a first image axis 58, possibly perpendicularly to the line extension direction 56.

Alternatively or additionally, the optical image stabilizer 46 may include an actuator 48b configured to translationally move the one-line array 38 along the line extension direction 56. On the basis of the translational movement of the one-line array 38 along the line extension direction 56, optical image stabilization may be obtained along a second image axis 62, possibly in parallel with the line extension direction 56 and/or in parallel with the direction of movement of the one-line array 38. The actuators 48a and 48b may be formed, for example, as piezoelectric actuators, pneumatic actuators, hydraulic actuators, DC motors, stepper motors, thermal actuators, electrostatic actuators, electrostrictive actuators, and/or magnetostrictive actuators. The actuators 48a and 48b may be formed to be identical with or different from each other. Alternatively, it is also possible for an actuator to be arranged which is configured to rotationally move the beam-deflecting means 18 and to translationally move the one-line array 38. For example, the rotation axis 54 may be parallel to the line extension direction 56. The rotational movement 52 about the axis of rotation 54 may result in little installation space that may be used for the imaging device 16 along a direction parallel to the image axis 58, so that the portable device, which inside a housing includes the imaging device 16, may also have small dimensions. In simplified terms, the portable device may comprise a flat housing.

The translational movement 26 may be implementable, e.g., in parallel or essentially in parallel with an extension of a main side 13a and/or 13b of the device 10, so that additional installation space, which may be used for switching the beam deflection between operating states, may be arranged along the line extension direction 56 and/or so that provision of installation space along a thickness direction of the device may be dispensed with. The actuators 48a and/or 48b may be arranged along the line extension direction and/or, perpendicular thereto, in parallel with an extension direction of main sides of the housing of the device. In simplified terms, this can be described such that actuators for switching between operating states and/or actuators of the optical image stabilizer may be arranged next to, in front of or behind an extension between the image sensor, the one-line array 38 and the beam-deflecting means 18, an arrangement thereabove and/or therebelow being dispensed with in order to keep an installation height of the imaging device 16 small. This means that actuators for switching the operating state and/or the optical image stabilizer may be arranged within a plane within which the image sensor 36, the one-line array 38 and the beam-deflecting means 18 are arranged.

In accordance with further embodiments, the actuator 48b and/or other actuators may be configured to change a distance between the image sensor 36 and the one-line array 38 and/or the optics of the optical channels. To this end, e.g., the actuator 48b may be configured to move the one-line array 38 and/or the image sensor 36 in relation to each other along an optical path of the optical paths 22-1 to 22-4 and/or perpendicularly to the line extension direction 56 so as to change a focus of the imaging of the field of view and/or to obtain an autofocus function.

The imaging device 16 may comprise a focusing means configured to change the focus of the imaging device. The focusing means may be configured to provide a relative movement between the one-line array 38 and the image sensor 36. The focusing means may be configured to perform the relative movement while performing a movement of the beam-deflecting means 18 that is simultaneous with the relative movement. For example, the actuator 48b or a further actuator may be configured to keep a distance between the one-line array 38 and the beam-deflecting means 18 at least essentially constant or, when no additional actuator is used, at least essentially constant, possibly precisely constant, i.e. to move the beam-deflecting means 18 as much as the one-line array 38 is moved. With cameras comprising no beam-deflecting means, implementation of a focusing function may result in an increased dimension (thickness) of the device.

On the basis of the beam-deflecting means, this may occur without any additional dimension resulting along a dimension that is parallel to a main side of the image sensor 36 and perpendicular to the line extension direction 56 (e.g. a thickness) of the multi-aperture imaging device since an installation space enabling said movement may be arranged to be perpendicular thereto. On the basis of a constant distance between the one-line array 38 and the beam-deflecting means 18, beam deflection may be maintained in an adjusted (possibly optimum) state. In simplified terms, the imaging device 16 may comprise focusing means for changing a focus. The focusing means may be configured to provide a relative movement (focusing movement) between at least one optic 41a-d of the optical channels of the multi-aperture imaging device 16 and the image sensor 36. The focusing means may comprise an actuator for providing the relative movement, e.g., the actuator 48b and/or 48a. The beam-deflecting means 18 may be moved along, on account of corresponding constructive configuration or utilization, possibly while using a further actuator, simultaneously with the focusing movement. This means that a distance between the one-line array 38 and the beam-deflecting means remains unchanged and/or that the beam-deflecting means 18 is moved, at the same time or with a time lag, to a same or comparable extent as the focusing movement occurs, so that it is unchanged, as compared to a distance prior to a change of focus, at least at a point in time when the field of view is captured by the multi-aperture imaging device.

The imaging device 16 includes a control means 53 configured to receive image information from the image sensor 36. To this end, an image of the total field of view is evaluated, said image being obtained by deflecting the optical paths 22-1 to 22-4 of the optical channels 42a to 42d with the first beam-deflecting area, and a corresponding, i.e. matching, image is evaluated, said image being obtained by deflecting the optical paths 22-1 to 22-4 of the optical channels 42a to 42d with the second beam-deflecting area, wherein any order of the first and second images may be used.

The control means 53 may generate two total images of the captured total field of view, e.g., using methods for the combination of images (stitching), wherein a first total image is based on the first wavelength range and a second total image is based on the second wavelength range.

The control means may be configured to, using the second capturing, to determine a depth map for the first capturing, e.g. based on a wavelength range that is not visible for humans, such as an infrared range, in particular a near-infrared range (NIR). To this end, the control means may be configured to, e.g., evaluate a pattern that is visible in the second wavelength range. Thus, e.g., a predefined pattern such as a dot pattern may be emitted in the NIR wavelength range towards the total field of view and a distortion of the pattern may be evaluated in the second capturing or image. The distortion may correlate with depth information. The control means 53 may be configured to provide the depth map using the evaluation of the depth information. As an alternative or addition to the spatial information of a pattern, temporal information may also be evaluated, e.g., when a temporal variance of the pattern is known.

The illumination source may be configured to emit the temporal and/or spatial illumination pattern with a third wavelength range that fully or partially includes the second wavelength range, so that the third wavelength range at least partially corresponds to the second wavelength range. This includes the fact that a partial reflection of the wavelengths of the emitted pattern already represents a sufficient source for the second wavelength range reaching the image sensor, and that wavelength shifts or partial reflections, e.g. based on absorptions, are also included. For example, the second wavelength range and the third wavelength may also be congruent.

As is described in connection with FIG. 1, the deflected optical paths of the optical channels may pass through a transparent area of a housing of the device, in which transparent area a diaphragm may be arranged. In at least one operating state of the device, a diaphragm arranged in an area of the transparent area may at least partly optically close said area such that the diaphragm is operative for two, a multitude of or all of the optical channels, i.e. is in the at least partly closed state. In a different operating state, the diaphragm may be in an opened state for the two, the multitude of or all of the optical channels. This means that the diaphragms may be operative for at least two optical channels of the multi-aperture imaging device. In the first operating state, the diaphragm 24b may at least partly optically close the transparent area 14b for the two, the multitude of or all of the optical channels. In the second operating state, the diaphragm 24a may at least partly optically close the transparent area 14a for the two, the multitude of or all of the optical channels.

Figure 5B:
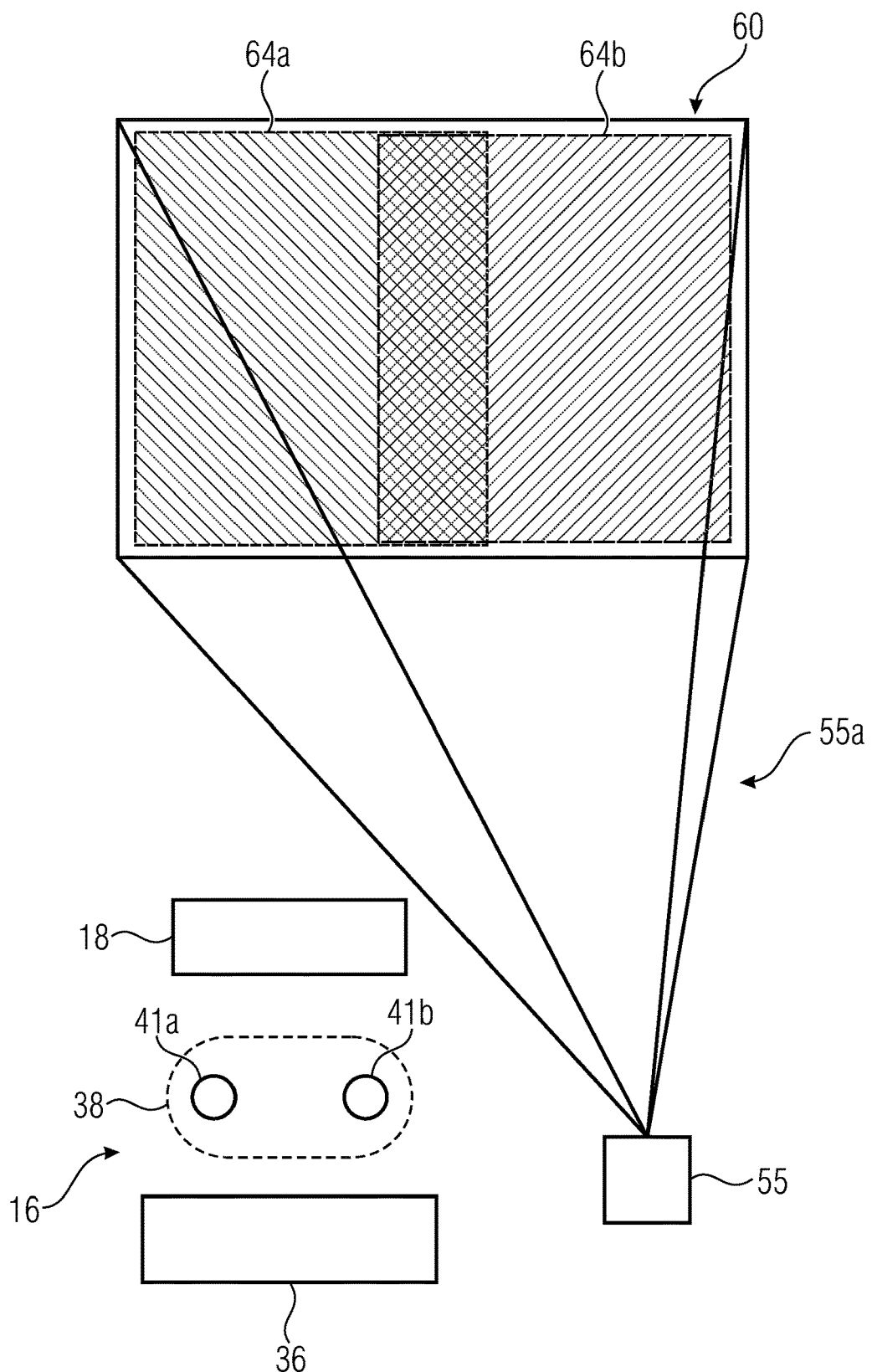
FIG. 5b shows a schematic perspective view of a multi-aperture imaging device according to an embodiment, comprising an illumination means configured to emit a temporal or spatial illumination pattern.

FIG. 5b shows a schematic perspective view of the multi-aperture imaging device 16 in accordance with an embodiment, wherein the array 38 exemplarily comprises two optical channels including the optics 41a-b, wherein any higher number is possible, such as three, four, five, or more. The optical channels 41a and 41b are each configured to capture a partial field of view 64a or 64b of a total field of view 60. The partial fields of view 64a and 64b overlap with one another and together form the total field of view 60.

The multi-aperture imaging device 16 includes an illumination means 55 configured to emit a temporal or spatial illumination pattern 55a, in particular towards the total field of view 60. The illumination pattern 55a may include a third wavelength range that at least partially overlaps with or corresponds to the second wavelength range, so that, when deflecting the optical paths using the second beam-deflecting area, the pattern distorted in the total field of view hits the image sensor and may be evaluated by the control means 53.

Figure 5C:
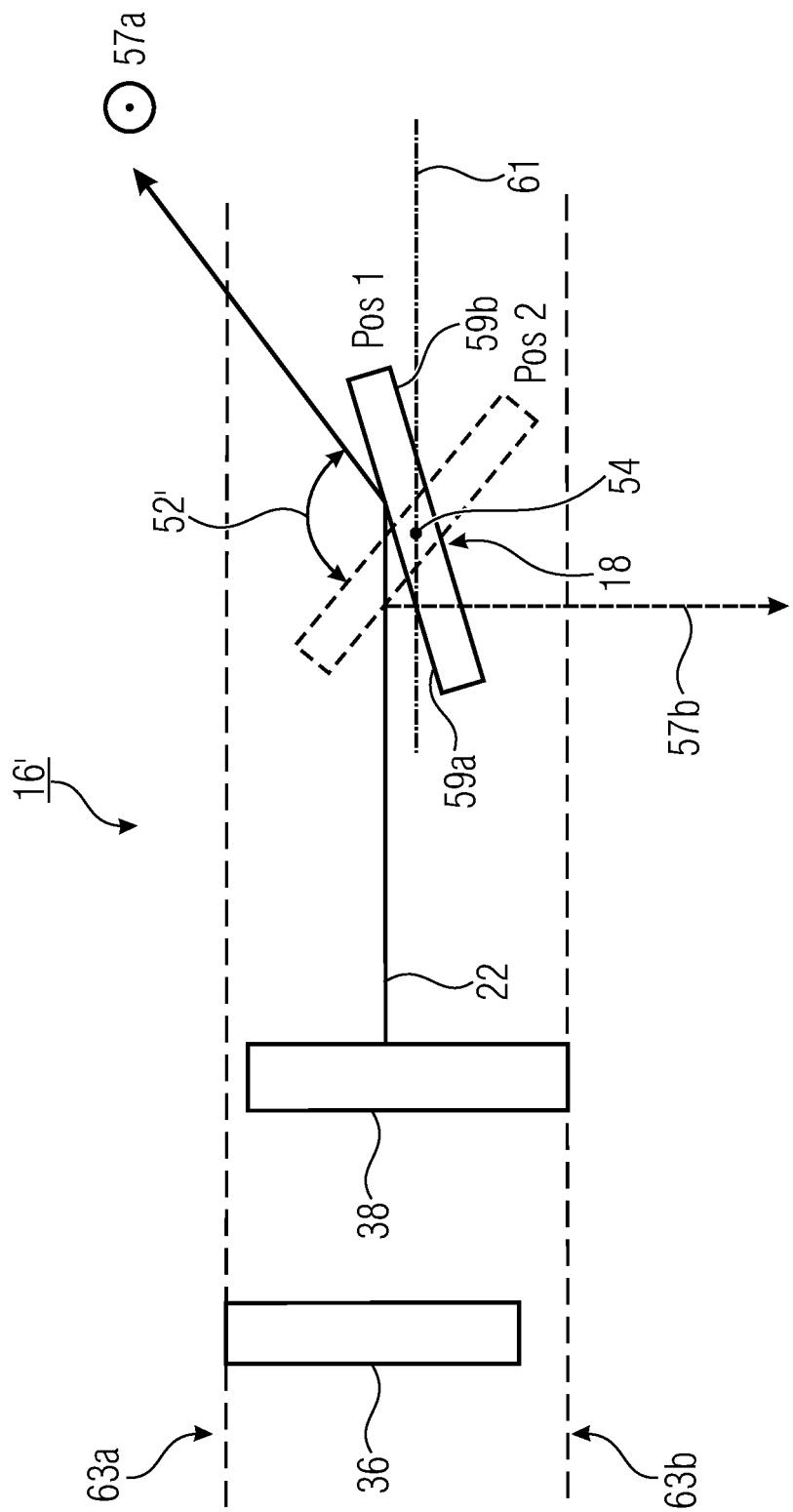
FIG. 5c shows a schematic sectional side view of a modified imaging device wherein the beam-deflecting means can be rotationally switched between a first position of the first operating state and a second position.

FIG. 5c shows a schematic sectional side view of a modified imaging device 16', wherein the beam-deflecting means 18 can be moved between a first position Pos1 of the first operating state and a second position Pos2 of the second operating state on the basis of a rotational movement 52' about the axis of rotation 54. In the first operating state, the imaging device 16' may comprise a first viewing direction 57a. In the second operating state, the imaging device 16' may have a first viewing direction 57b. Main sides 59a and 59b of the beam-deflecting means 18 may be formed to be reflective as mirrors and/or as facet elements. During switching between the operating states, the beam-deflecting means 18 may be switchable between a central position 61, so that a difference between parallel planes 63a and 63b, which distance may describe a minimum dimension of the imaging device 16' along a normal direction of the planes 63a and 63b, is influenced by the dimensions of the image sensor 36, of the array 38, but not by a movement of the beam-deflecting means 18. The rotational movement 52 may be superimposed by the rotational movement 28. In simplified terms, superposition of switching and of optical image stabilization may be implemented.

Actuators of the multi-aperture imaging device may be arranged to be at least partly arranged between two planes 63a and 63b spanned (defined) by sides of a cuboid. The sides of the cuboid may be arranged in parallel with one another as well as in parallel with the line extension direction of the array and of some of the optical path of the optical channels between the image sensor and the beam-deflecting means. The volume of the cuboid is minimal and nevertheless includes the image sensor, the array and the beam-deflecting means as well as their operation-related movements.

A thickness direction of the multi-aperture imaging device may be arranged perpendicularly to the planes 63a and/or 63b. The actuators may have a dimension or extension that is in parallel with the thickness direction. Starting from an area located between the planes 63a and 63b, a proportion of a maximum of 50%, a maximum of 30%, or a maximum of 10% of the dimension may project beyond the plane 63a and/or 63b or beyond said area. Thus, the actuators protrude beyond the plane 63a and/or 63b to a most insignificant extent, for example. In accordance with embodiments, the actuators do not protrude beyond the planes 63a and/or 63b. What is advantageous about this is that extension of the multi-aperture imaging device along the thickness direction is not increased by the actuators.

A volume of the multi-aperture imaging device may comprise a small, or minimal, installation space between the planes 63a and 63b. Along the lateral sides or extension directions of the planes 63a and/or 63b, an installation space of the multi-aperture imaging device may be large or have any size desired. The volume of the virtual cuboid is influenced, for example, by an arrangement of the image sensor 36, of the array 38 and of the beam-deflecting means; these components may be arranged, in accordance with the embodiments described herein, such that the installation space of these components along the direction perpendicular to the planes and, therefore, the mutual distance between the planes 63a and 63b become small or minimal. As compared to other arrangements of the components, the volume and/or the distance of other sides of the virtual cuboid may be enlarged.

Figure 6A:
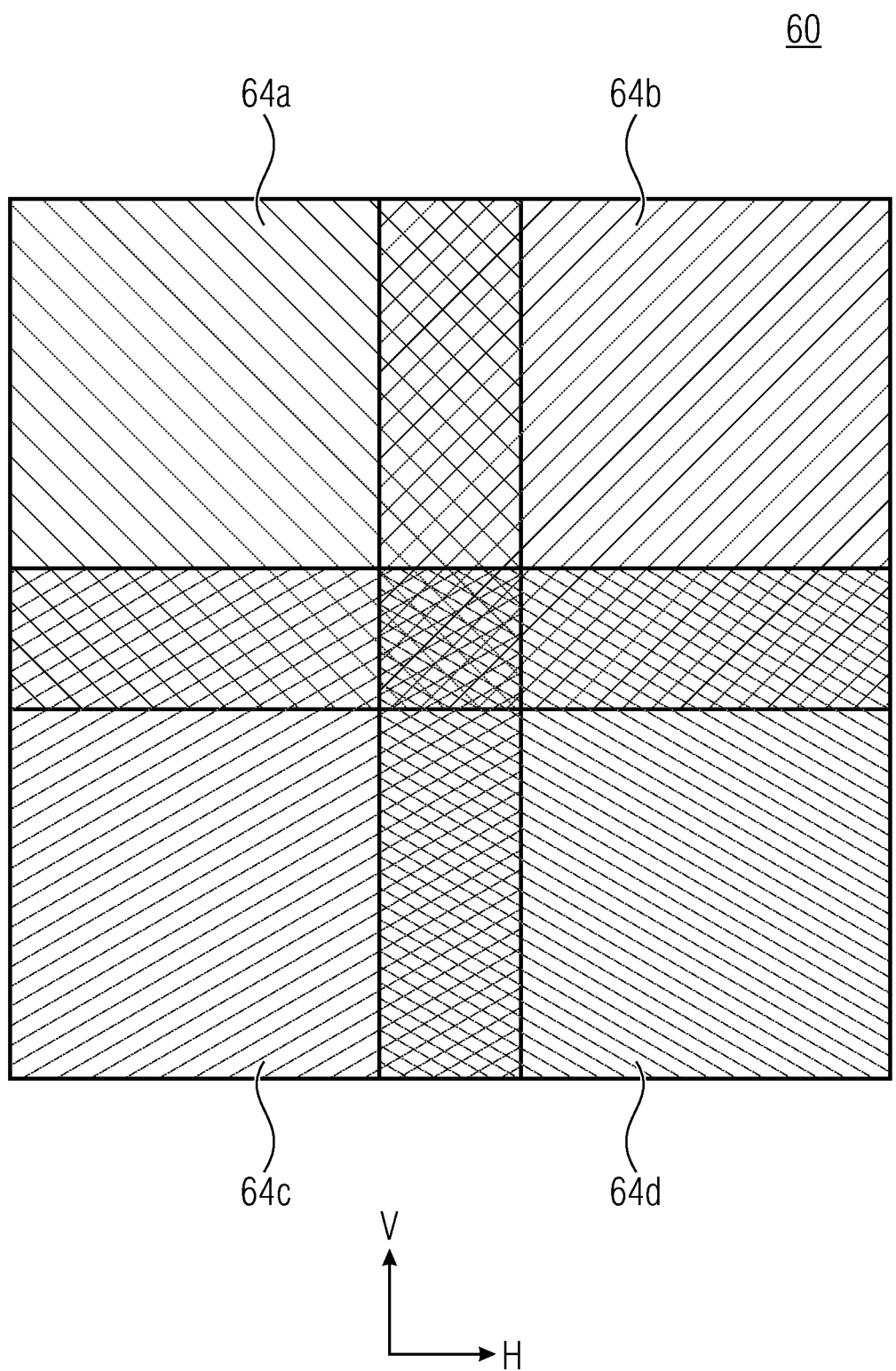
FIG. 6a shows a schematic view of a total field of view including four mutually overlapping partial fields of view.

FIG. 6a shows a schematic view of a total field of view 60 including four mutually overlapping partial fields of view 64a-d. The partial fields of view 64a-d are exemplarily arranged in the object area along two directions H and V that, for example but not in a limiting manner, may designate a horizontal direction and a vertical direction. Any other directional arrangement is possible. With reference to FIG. 5a, for example, the optical path 22-1 may be directed toward the partial field of view 64a, the optical path 22-2 may be directed toward the partial field of view 64b, the optical path 22-3 may be directed toward the partial field of view 64c, and/or the optical path 22-4 may be directed toward the partial field of view 64d. Even though an association between the optical paths 22-1 to 22-4 with the partial fields of view 64a-d is arbitrary, it becomes clear that starting from the beam-deflecting means 18, the optical paths 22-1 to 22-4 are directed in mutually different directions. In the embodiment described, although the total field of view 60 is captured by means of four optical channels that capture the partial fields of view 64a-d, the total field of view 60 may also be captured by any other number of partial fields of view larger than 1, i.e. at least 2, at least 3, at least five, at least seven, or more.

Figure 6B:
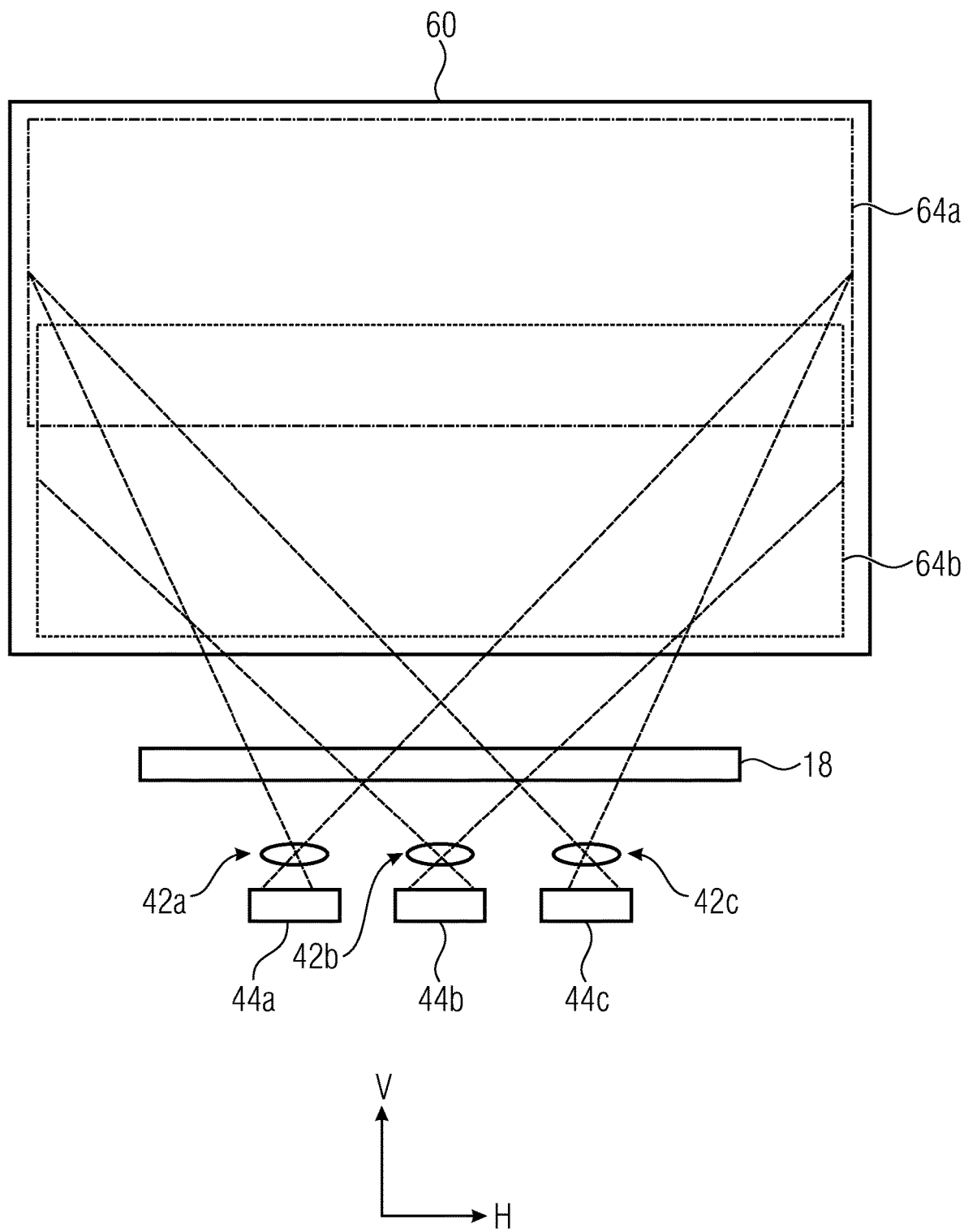
FIG. 6b shows the total field of view distributed differently than in FIG. 6a, wherein a partial field of view is captured twice and partial fields of view are adjacently arranged along a first direction.
Figure 6C:
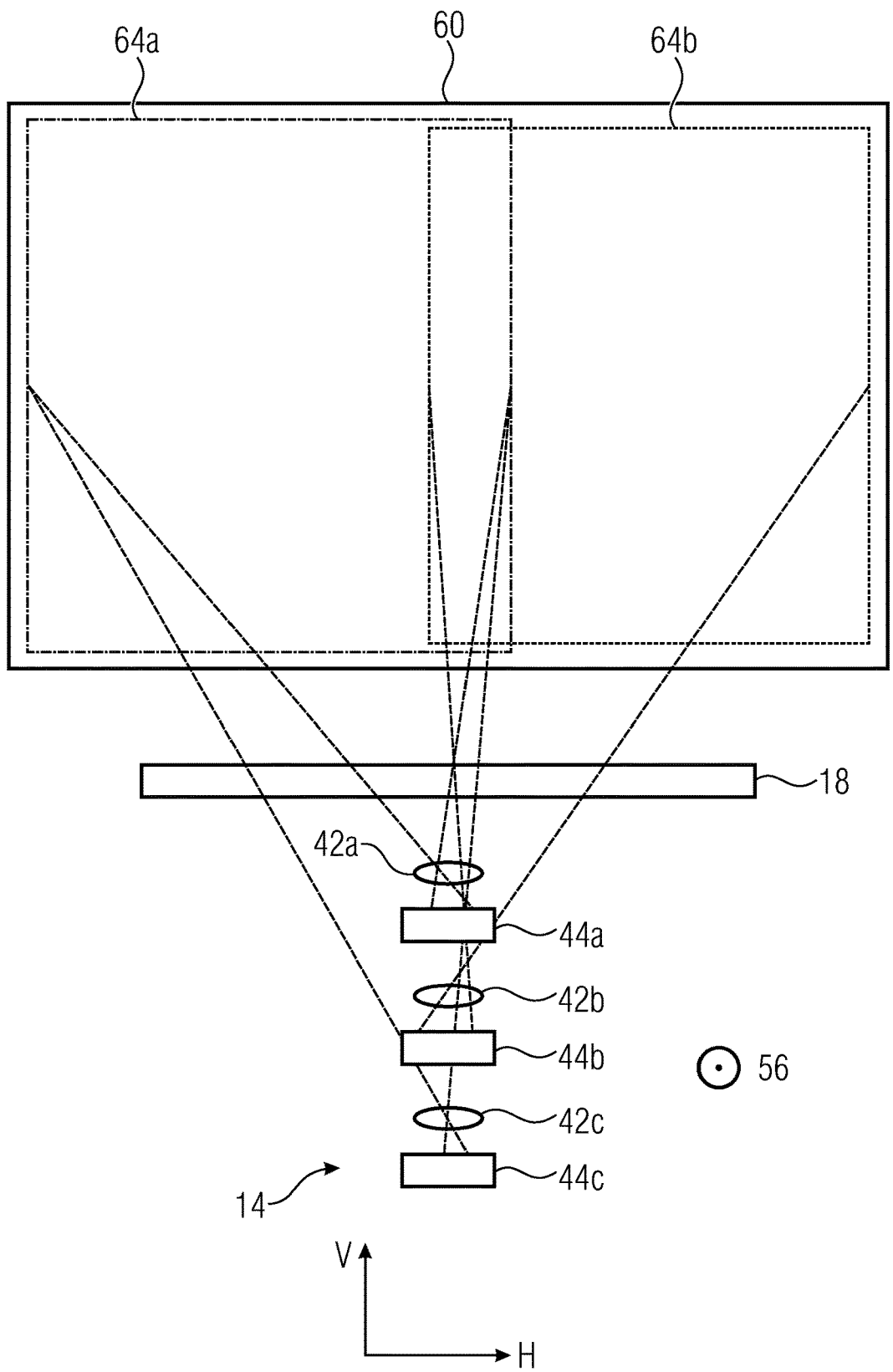
FIG. 6c shows the total field of view distributed differently than in FIG. 6a, wherein a partial field of view is captured twice and partial fields of view are adjacently arranged along a second direction.

FIG. 6b shows a possible division of the total field of view 60 that differs from FIG. 6a, e.g., the total field of view being captured by only two partial fields of view 64a and 64b. For example, the partial fields of view 64a and 64b may be arranged along the direction V or, as is illustrated in FIG. 6c, along the direction H, and overlap one another in order to enable an effective image combination. The partial fields of view are illustrated as having different sizes only in order to differentiate them more effectively, even if this may indicate a corresponding optional implementation in such a manner.

In principle, an assignment of the partial fields of view 64a and 64b with respect to the optical channels as well as a relative orientation of the array 14 may be arbitrary. A direction the partial fields of view are arranged along, e.g. V in FIG. 6b or H in FIG. 6c, may be arranged arbitrarily as to the line-extension direction 56 of the array 14. In an advantageous arrangement, the line-extension direction 56 and the direction the partial fields of view are arranged along are disposed perpendicularly to one another within a tolerance range of ±25°, ±15°, or ±5°, advantageously perpendicular to each other. In FIG. 6b, the line-extension direction 56 is arranged in parallel to the direction H that is arranged perpendicularly to V, for example. In FIG. 6c, the line-extension direction 56 is also rotated in accordance with the arrangement of the partial fields of view 64a and 64b, which are rotated as compared to FIG. 6b, so that the line-extension direction 56 is parallel to V, or perpendicular to H within the designated tolerance range. Therefore, the optical channels 42a-c and the image sensor areas 44a-c could also overlap in the illustration plane of FIG. 6c or could be congruent within the tolerance range, and are illustrated to be offset for the sake of the illustration.

Multi-aperture imaging devices in accordance with embodiments may be configured to capture the total field of view 60 through at least two partial fields of view 64a-b. In contrast to partial fields of view that are captured in a single-channel manner, such as the partial field of view 64b or the partial fields of view according to the discussions with respect to FIG. 6a, at least one of the partial fields of view may be captured by at least one first optical channel 42a and one second optical channel 42c. For example, the total field of view may be segmented into exactly two partial fields of view 64a and 64b. Exactly one of the partial fields of view, e.g., the partial field of view 64a, may be captured through two optical channels 42a and 42c. Other partial fields of view may be captured in a single-channel manner.

To this end, multi-aperture imaging devices according to embodiments provide the use of exactly two optical channels in order to image the two partial fields of view 64a and 64b in the respective wavelength range or in both wavelength ranges. With such a configuration, there is the possibility of overlaps, or occlusion effects, occurring in the overlap area, meaning that, instead of a dual capturing of a field of view arranged behind an object, only one viewing angle is captured. In order to reduce or avoid such effects, some embodiments provide capturing at least one of the partial fields of view 64a and/or 64b with a further optical channel 42a-c so that at least this channel 42a-c is captured multiple times, in particular twice. Any other number of partial fields of view captured twice and/or any other number of partial fields of view and/or any other number of optical channels is also possible.

As is shown based on FIG. 6b and FIG. 6c, in order to capture a partial field of view 64 several times, the optical channels 42a and 42c and/or the image sensor areas 44a and 44c may be arranged symmetrically around an optical channel 42b for capturing the other partial field of view, may be spaced apart in the array 14 by at least one optical channel 42b directed onto another partial field of view, and/or comprise an enlarged distance or maximum distance within the array towards each other in order to enable a certain measure of disparity.

FIG. 7a shows a schematic perspective view of a device 70₁ which includes a first multi-aperture imaging device 16a and a second multi-aperture imaging device 16b and is configured to stereoscopically capture the total field of view 60 by using the multi-aperture imaging devices. The total field of view 60 is arranged, e.g., on a main side 13b facing away from the main side 13a. For example, the multi-aperture imaging devices 16a and 16b may capture the total field of view 60 by means of transparent areas 14a and/or 14c; diaphragms 24a and 24c arranged in the main side 13b are at least partly transparent. Diaphragms 24b and 24d, arranged in the main side 13a, may at least partly optically close transparent areas 14b and/or 14d, so that an extent of stray light coming from a side facing the main side 13a, which stray light may falsify the images captured by the multi-aperture imaging devices 16a and/or 16b, is at least reduced. Even though the multi-aperture imaging devices 16a and 16b are depicted to be arranged in a mutually spaced-apart manner, the multi-aperture imaging devices 16a and 16b may also be arranged in a spatially adjacent or combined manner. For example, the one-line arrays of the imaging devices 16a and 16b may be arranged adjacently to or in parallel with one another. The one-line arrays may form lines with regard to one another, each multi-aperture imaging device 16a and 16b comprising a one-line array. The imaging devices 16a and 16b may comprise a shared beam-deflecting means and/or a shared carrier 39 and/or a shared image sensor 36.

The transparent areas 14a-d may additionally be equipped with a switchable diaphragm 24a-d which covers the optical structure for when it is not in use. The diaphragm 24a-d may include a mechanically moveable part. The movement of the mechanically moveable part may be effected while using an actuator as is described, e.g., for actuators 48a and 48b. Alternatively or additionally, the diaphragm may be electrically controllable and include an electrochromic layer or a sequence of electrochromic layers.

In accordance with an advantageous embodiment in FIG. 7b, a device 70₂ is similarly implemented as the device 70₁, however, it is implemented such that, instead of a stereoscopic capturing, the depth information is created from the capturing in one of the wavelength ranges, e.g. through the evaluation of a pattern distortion in a non-visible wavelength range. According to this advantageous embodiment, e.g., the device 70 is implemented with only a single imaging device 16 and is configured to capture the total field of view from a perspective, i.e. that of the imaging device 16, and to not capture a stereoscopic capturing of the total field of view.

However, the device 70 may also be implemented according to the advantageous implementation in order to provide or generate a depth map of the total field of view, e.g. by evaluating a pattern distortion in one of the captured wavelength ranges, e.g. by means of the control means 53 or a specially implemented calculation means of the device 70 or the imaging device 16.

The device 70 may be implemented excluding an additional infrared camera that supplements or extends the imaging device 16, since such a functionality is already implemented in the imaging device 16, possibly involving the illumination means 55.

Figure 7C:
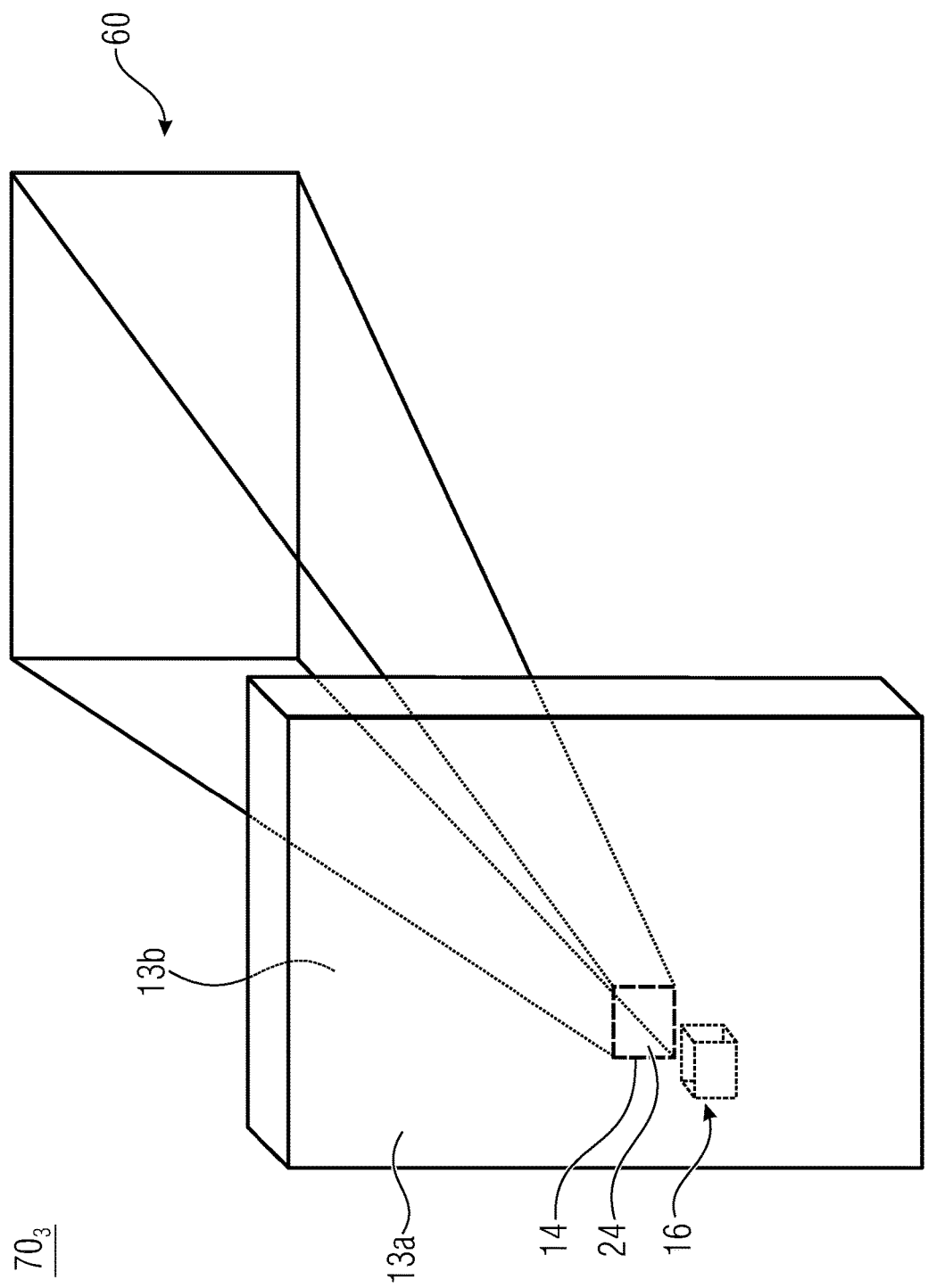
FIG. 7c shows a schematic perspective view of an advantageous implementation of a multi-aperture imaging device according to an embodiment, comprising a single viewing direction.

According to a further advantageous implementation that is illustrated in FIG. 7c, the imaging device 16 of a device 70₃ is configured, in contrast to the devices 70₁ and 70₂, to comprise only one viewing direction so that an arrangement of a corresponding viewing window into other directions as well as the diaphragms, which are optional in any case, may be omitted.

Through the evaluation of the two wavelength ranges, the devices 70₂ and 70₃ may be configured to create a depth map of the total field of view.

Figure 8:
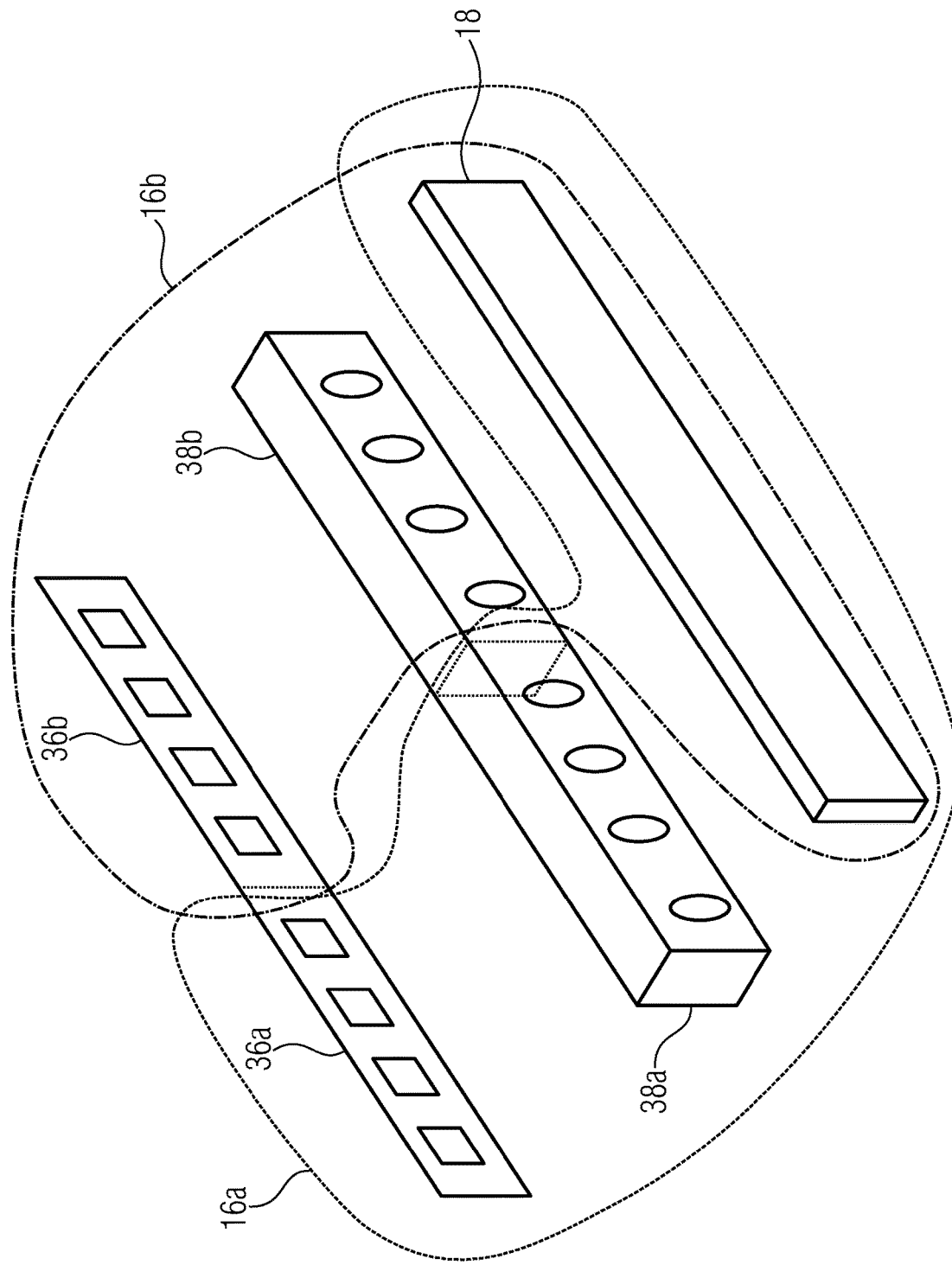
FIG. 8 shows a schematic structure including a first multi-aperture imaging device and a second multi-aperture imaging device comprising a shared image sensor.

FIG. 8 shows a schematic structure including a first multi-aperture imaging device 16a and a second multi-aperture imaging device 16b as may be arranged, for example, in the imaging system 70₁. The multi-aperture imaging devices 16a and 16b may be fully or partially formed as a mutual multi-aperture imaging device. The one-line arrays 38a and 38b form a shared line. The image sensors 36a and 36b may be mounted on a shared substrate and/or on a shared circuit carrier such as a shared circuit board or a shared flex board. Alternatively, the image sensors 36a and 36b may also include mutually different substrates. Various combinations of said alternatives are also possible, of course, such as multi-aperture imaging devices including a shared image sensor, a shared array and/or a shared beam-deflecting means 18 as well as further multi-aperture imaging devices comprising separate components. What is advantageous about a shared image sensor, a shared one-line array and/or a shared beam-deflecting means is that a movement of a respective component may be achieved with high precision by controlling a small number of actuators and that synchronization between actuators may be reduced or avoided. Moreover, a high level of thermal stability may be achieved. Alternatively or additionally, further multi-aperture imaging devices may also comprise a shared array, a shared image sensor and/or a shared beam-deflecting means. By arranging at least one further group of imaging optical channels, wherein any number thereof may be implemented, the multi-aperture imaging device may be configured to at least stereoscopically capture the total field of view.

It was already pointed out above that starting from the beam-deflecting means, the optical paths and/or optical axes may be directed into mutually different directions. This may be achieved in that the optical paths are directed during deflection at the beam-deflecting means and/or by the optics in deviation from being mutually parallel. The optical paths and/or optical axes may deviate from being parallel prior to, or without any, beam deflection. This circumstance will be circumscribed below by the fact that the channels may be provided with some kind of pre-divergence. With said pre-divergence of the optical axes it would be possible that, e.g., not all of the facet inclinations of facets of the beam-deflecting means differ from one another but that some groups of channels comprise, e.g., the facets having equal inclinations or are directed to same. The latter may then be formed to be integral or to continually merge into one another as a facet, as it were, which is associated with said group of channels adjacent in the line extension direction. The divergence of the optical axes of these channels might then originate from the divergence of these optical axes as is achieved by a lateral offset between optical centers of the optics of the optical channels and image sensor areas of the channels. The pre-divergence might be limited to a plane, for example. The optical axes might extend, e.g., within a shared plane prior to, or without any, beam deflection, but extend in a divergent manner within said plane, and the facets cause only an additional divergence within the other transversal plane, i.e. they are all inclined in parallel with the line extension direction and are mutually inclined only in a manner that is different from the above-mentioned shared plane of the optical axes; here, again, several facets may have the same inclination and/or be commonly associated with a group of channels whose optical axes differ pair by pair, e.g. already within the above-mentioned shared plane of the optical axes, prior to or without any beam deflection. In simplified terms, the optics may enable a (pre-) divergence of the optical paths along a first (image) direction, and the beam-deflecting means may enable a divergence of the optical paths along a second (image) direction.

The above-mentioned possibly existing pre-divergence may be achieved, for example, in that the optical centers of the optics lie on a straight line along the line extension direction, whereas the centers of the image sensor areas are arranged such that they deviate from the projection of the optical centers along the normal of the plane of the image sensor areas onto points that lie on a straight line within the image sensor plane, for example at points which deviate from the points that lie on the above-mentioned straight line within the image sensor plane, in a channel-specific manner, along the line extension direction and/or along the direction perpendicular to both the line extension direction and the image sensor normal. Alternatively, pre-divergence may be achieved in that the centers of the image sensors lie on a straight line along the line extension direction, whereas the centers of the optics are arranged to deviate from the projection of the optical centers of the image sensors along the normal of the plane of the optical centers of the optics onto points that lie on a straight line within the optic center plane, for example at points which deviate from the points that lie on the above-mentioned straight line within the optical center plane, in a channel-specific manner, along the line extension direction and/or along the direction perpendicular to both the line extension direction and the normal of the optical center plane. It is advantageous that the above-mentioned channel-specific deviation from the respective projection take place only in the line extension direction, i.e. that the optical axes which are located merely within a shared plane be provided with a pre-divergence. Both optical centers and image sensor area centers will then each be located on a straight line in parallel with the line extension direction, but with different intermediate gaps. A lateral offset between lenses and image sensors in the lateral direction perpendicular to the line extension direction would therefore result in an increase in the installation height. A mere in-plane offset in the line extension direction does not change the installation height but might possibly result in a reduced number of facets and/or in that the facets are tilted only in an angle orientation, which simplifies the design. For example, optical channels which are adjacent in each case may comprise optical axes which extend within the shared plane and are squinting in relation to one another, i.e. are provided with a pre-divergence. A facet may be arranged, with regard to a group of optical channels, to be inclined merely in one direction and to be parallel to the line extension direction.

Moreover, provision might be made for some optical channels to be associated with the same partial field of view, e.g. for the purpose of achieving a super-resolution and/or for increasing the resolution with which the corresponding partial field of view is scanned by said channels. The optical channels within such a group would then extend in parallel, e.g. prior to beam deflection, and would be deflected onto a partial field of view by one facet. Advantageously, pixel images of the image sensor of a channel of one group would be located at intermediate positions between images of the pixels of the image sensor of another channel of this group.

What would also be feasible, for example, even without any super-resolution purposes, but only for stereoscopy purposes, would be an implementation wherein a group of directly adjacent channels fully cover the total field of view with their partial fields of view in the line extension direction, and that a further group of mutually directly adjacent channels, for their part, fully cover the total field of view.

The above embodiments thus may be implemented in the form of a multi-aperture imaging device and/or of a device including such a multi-aperture imaging device, specifically with a one-line channel arrangement, wherein each channel transmits a partial field of view of a total field of view and wherein the partial fields of view partly overlap. A design comprising several such multi-aperture imaging devices for stereo, trio, quattro, etc. designs for 3D imaging is possible. In this context, most modules may be implemented as one contiguous line. The contiguous line might benefit from identical actuators and a shared beam-deflecting element. One or more amplifying substrates that might possibly exist within the optical path may extend across the entire line, which may form a stereo, trio, quattro design. Super-resolution methods may be employed, several channels imaging the same partial image areas. The optical axes may extend in a divergent manner already without any beam-deflecting device, so that fewer facets on the beam-deflecting unit may be used. The facets will then advantageously only exhibit one angular component. The image sensor may be in one part, comprise only one contiguous pixel matrix or several interrupted ones. The image sensor may be composed of many partial sensors which are arranged, e.g., adjacently to one another on a printed circuit board. An autofocus drive may be configured such that the beam-deflecting element is moved synchronously with the optics or is idle.

In principle, any number of submodules including image sensor(s), imaging optic(s) and mirror array(s) may be arranged. Submodules may also be configured as a system. The submodules or systems may be installed within a housing such as a smart phone, for example. The systems may be arranged in one or more lines and/or rows and at any desired location. For example, two imaging devices 16 may be arranged within the housing 12 so as to enable stereoscopic capturing of a field of view.

In accordance with further embodiments, the device 70 includes further multi-aperture imaging devices 16, so that the total field of view 60 may be scanned by means of more than two multi-aperture imaging devices. This enables a number of partially overlapping channels which capture the total field since their viewing directions are adapted channel by channel. For capturing the total field of view in a stereoscopic manner or in a manner comprising a higher order, at least one further arrangement of channels may be arranged in accordance with embodiments described herein and/or with the described arrangement of channels, which may take shape as precisely one line or as separate modules. This means that the one-line array may be arranged, in a multi-line manner, with a further line; said further line of optical channels can be associated with a further multi-aperture imaging device. The optical channels of the further line may also capture respectively overlapping partial areas and together cover the total field of view. This enables obtaining a stereo, trio, quattro, etc. structure of array cameras consisting of channels which partly overlap and which cover the total field of view within their subgroup.

In other words, multi-aperture cameras comprising a linear channel arrangement may include several optical channels arranged adjacently to one another and transmitting parts of the total field of view, respectively. In accordance with embodiments, a mirror (beam-deflecting means) may be advantageously arranged before the imaging lenses, which mirror may be used for beam deflection and may contribute to reducing the installation height. In combination with a mirror adapted channel-by-channel such as a facet mirror, for example, wherein the facets may be planar or exhibit any type of curvature or be provided with a freeform surface, it may be advantageous to structure the imaging optics of the channels in an essentially identical manner, whereas the viewing directions of the channels are influenced or predefined by the individual facets of the mirror array. In combination with a planar mirror (a mirror configured to be flat), the imaging optics of the channels may be configured or implemented differently, so that different viewing directions will result. The deflection mirror (beam-deflecting device) may be pivoted; the axis of rotation may extend perpendicularly to the optical channels, i.e., in parallel with the line extension direction of the channels. The deflection mirror may be reflective on both sides; metallic or dielectric layers or sequences of layers may be arranged to obtain reflectivity. Rotation or translational displacement of the mirror may be analogous or stable along two or several directions. Stable may be understood to mean that a force is to be applied to achieve a movement along a predicted direction; when said force is fallen below, this may result in freezing or a rearward movement of the beam-deflecting means.

The analogous rotation (rotation movement 52) may be used for one-dimensional adaptation of the image location, which may be understood as being optical image stabilization. For example, a movement by only a few degrees may be sufficient here, e.g., ≤15°, ≤10° or ≤1°. The rotation of the mirror which is stable along two or several directions may be used for switching the viewing direction of the camera. One may switch, for example, between the viewing directions in front of, next to and behind the display. Analogous movements or positions and movements or positions which are stable along two/several directions may be combinable, i.e., superimposable. For example, solutions found for portable devices such as smartphones, for example, which use two cameras with different viewing directions toward the front and toward the rear, may be replaced, by embodiments described herein, by a structure which includes only one imaging device. Unlike known solutions, the structure may be characterized, for example, that the viewing window is arranged within the housing for the cameras with front and rear viewing directions at the same position, i.e. in an opposite manner within upper or lower housing covers. Areas of said housing covers which are arranged for beam passage may be transparent and may consist of or include glass and/or polymers in the event that visible light is used.

Even though the above-described embodiments have been described in the sense that the device has first and second operating states, further operating states may be arranged, in accordance with further embodiments, for capturing further fields of view, i.e., at least a third field of view.

Subsequently, particularly advantageous implementations of multi-aperture imaging devices are described based on FIGS. 9a-d, wherein the devices may be implemented for themselves or as part of an inventive device such as the device $70_1$, $70_2$ and/or $70_3$.

For example, the illustrated side sectional views relate to respective facets of a facetted beam-deflecting means. For example, the beam-deflecting means may be formed as an array of facets. One facet may be assigned to each optical channel, wherein each facet may deflect one or several optical channels. Each of the facets may comprise a corresponding first beam-deflecting area and a second beam-deflecting area. As is illustrated FIGS. 4c-4f, the facets of the array of facets may be formed as mirrors that are reflective on both sides. The wedge shape illustrated in FIGS. 4c-4f may enable a small installation size, in particular when using only one viewing direction or when combining a rotational movement with a translational movement for switching between the four positions used for capturing two viewing directions and the use of two wavelength ranges. To this end, the beam-deflecting means may be moved such that, for alternately deflecting with different sides, the front edge of the facet is slightly moved up and down without the surface normal of the sides 35a and 35b being parallel to a surface normal of the image sensor.

On the other hand, a simple and/or small installation size along the line-extension direction of the array may be obtained by supporting the beam-deflecting means to be rotational around 90° or more, e.g. approximately 180° or even 360°. In this way, e.g., the four mentioned positions may be obtained solely by a rotational movement so that additional facets and/or a translational movement may be omitted. Furthermore, this enables a simple implementation of the facets as plane-parallel mirrors, e.g. as a single plane-parallel mirror, adjusting the divergence of the optical paths by means of the optics, and/or as mutually slanted or tilted plane-parallel facets that fully or partially adjust the divergence.

Figure 9A:
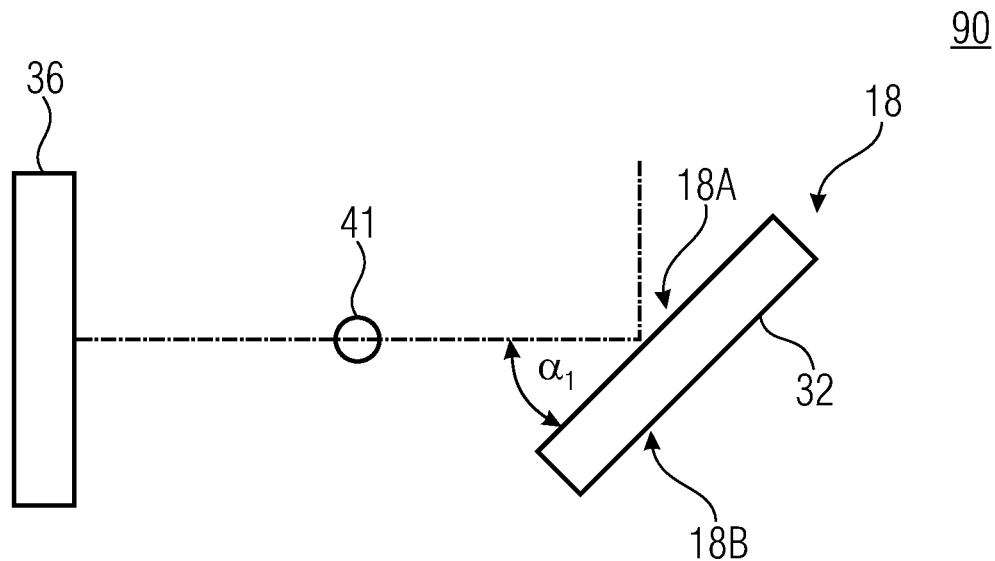
FIGS. 9a-d show schematic views of a multi-aperture imaging device according to an embodiment, using different wavelength ranges.

FIG. 9a shows a schematic side-sectional view of a multi-aperture imaging device 90 according to an embodiment, wherein the opposite sides 18A and 18B are implemented to deflect an optical path 22 in such a way that a filtering takes place at the sides 18A and 18B with respect to the reflective wavelength. The beam-deflecting means is shown in a first position in which the side 18A faces the image sensor 36.

The beam-deflecting means 18A comprises a first beam-deflecting area, e.g., formed at the side 18A and operative for a first wavelength range of electromagnetic radiation passing through the optical channel, e.g. the visible wavelength range. The beam-deflecting means comprises a second beam-deflecting area 18B, e.g., operative for a second wavelength range of electromagnetic radiation passing through the optical channel, e.g. ultraviolet (UV), infrared (IR) or near-infrared (NIR), the second wavelength range being different from the first wavelength range.

The wavelength ranges may be disjunctive, however, may also partially overlap, as long as they are at least partially different and therefore enable obtaining different image information.

This enables obtaining capturings of different wavelength ranges by means of the image sensor 36 so that, e.g., the second capturing may be used to create a depth map for the first capturing, particularly in combination with a coded (N)IR pattern emitted by the device 90.

FIG. 9a shows the beam-deflecting means 18 in a first position. For obtaining a first capturing of the total field of view, the beam-deflecting means may be configured to comprise a tilt angle $\alpha_1$ of the first beam-deflecting area 18A with respect to the image sensor of 45° within a tolerance range of ±10°, ±5°, or ±2°. For example, the side 18A fully provides the corresponding first beam-deflecting area and the side 18B fully provides the corresponding second beam-deflecting area, so that the terms are used synonymously herein. However, the beam-deflecting areas may also only cover part of the side.

Figure 9B:
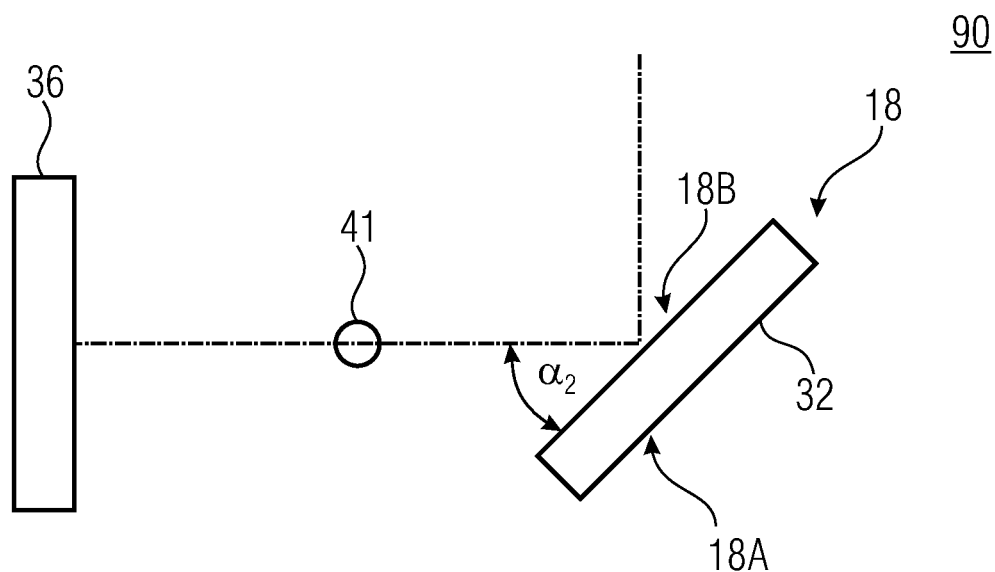

FIG. 9b shows the beam-deflecting means 18 in a second position, where the side 18B faces the image sensor so that the side 18B is operative to deflect NIR light, for example. For example, the beam-deflecting means 18 may be rotated around 180° compared to the first position. The beam-deflecting area 18A may be arranged on a first side of the beam-deflecting means 18, and the second beam-deflecting area 18B may be arranged on a second side arranged opposite to the first side. In its entirety or in the individual beam-deflecting elements, the beam-deflecting means 18 may be configured such that, in order to capture the first capturing of the total field of view, the first side is arranged to face the image sensor, and, in order to capture a second capturing of the total field of view, the second side is arranged to face the image sensor. A rotational and/or translational movement may be used to change the sides facing the image sensor.

A plane-parallel implementation of the beam-deflecting means or of the facet thereof makes it possible that the facet, or the beam-deflecting means 18, for obtaining a second capturing of the total field of view, e.g. using the second wavelength range, comprises a tilt angle $\alpha_2$ of the second beam-deflecting area 18B with respect to the image sensor of 45° within a tolerance range of ±10°, ±5°, or ±2°. For example, the tolerance ranges may compensate the fact that beam-deflecting elements include a tilt angle that slightly differs from 45°, resulting from a slanting or tilting of different facets of the beam-deflecting means 18 with respect to each other, so that approximately 45° may be obtained on average, however, the individual facets or deflection areas deviate therefrom due to their individual tilt.

The beam-deflecting means 18A and 18B may be obtained through differently implemented coatings that are operative to be reflective or non-reflective in the first and second wavelength ranges, respectively.

Embodiments provide that a corresponding coating having one or several layers is provided on the sides of the beam-deflecting means 18 in order to generate the beam-deflecting areas 18A and 18B. For example, these layers may comprise one or several dielectric layers that, with respect to their layer thickness, may be adapted to the tilt angle of the beam-deflecting means.

Since, depending on the selected operation mode or the desired wavelength range for the capturing, portions of wavelength ranges, particularly of the respectively other wavelength range, may strike the beam-deflecting means 18, some embodiments comprise an area for absorbing certain wavelengths, e.g. a volume absorber or the like. The area may be covered by the coating so that, e.g., a reflection of some wavelengths is first carried out, and non-reflected, e.g. transmitted, wavelength ranges are absorbed. Thus, e.g., when capturing the first wavelength range, the corresponding wavelengths may be reflected by the coating, whereas other wavelengths, e.g. at least undesired parts of the second wavelength range, for example, are transmitted, i.e. let to pass through, by these layers. The absorption area arranged behind the coating may absorb these portions in order to avoid, or at least reduce, a negative influence on the imaging in the multi-aperture imaging device. A complementary means for absorption of undesired parts of the first wavelength range may be arranged on the second side, operative when the second wavelength range 18B is used for the beam-deflection.

Figure 9C:
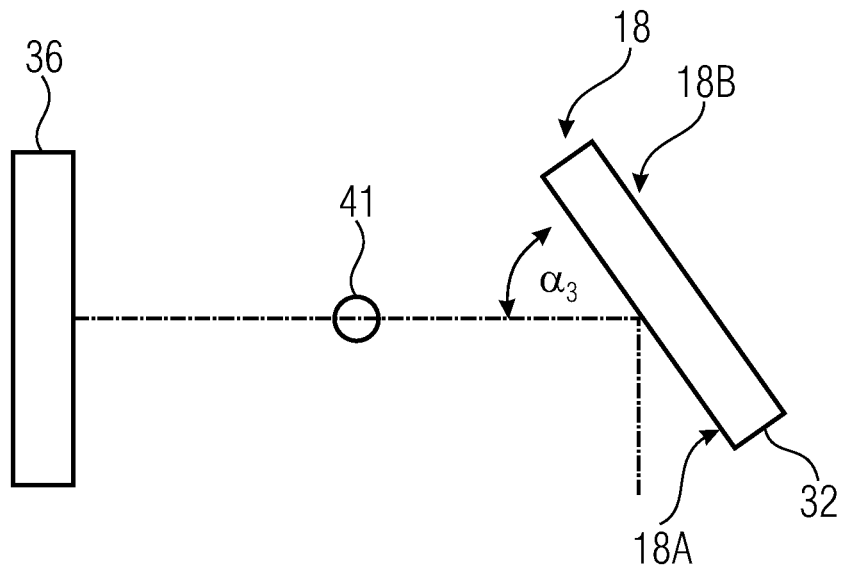

FIG. 9c shows the beam-deflecting means 18 in an optional third position, where the side 18A again faces the image sensor, however, the tilt is selected such that the optical paths are deflected towards a second total field of view, e.g., which is the first total field of view of FIG. 9a and FIG. 9b.

Figure 9D:
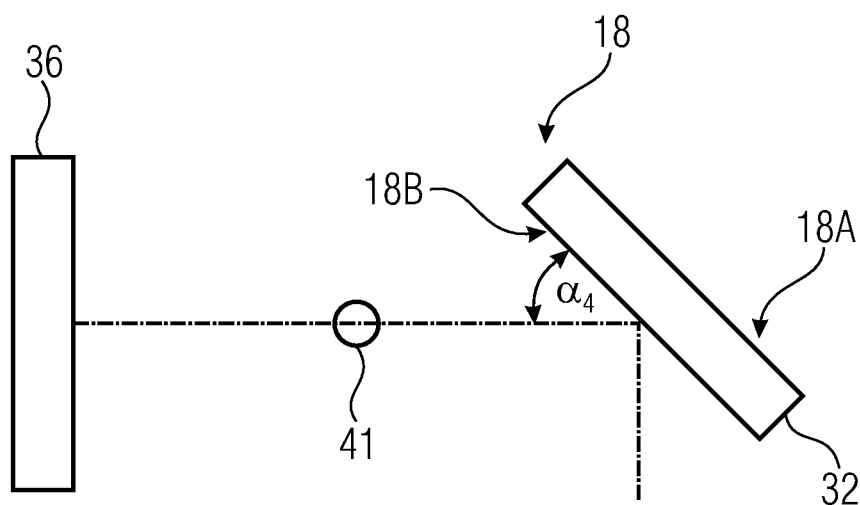

FIG. 9d shows the beam-deflecting means in an optional fourth position, where the side 18B again faces the image sensor, e.g., so that the side 18B is operative to deflect from the second total field of view towards the image sensor 36.

By means of the additional positions for capturing the second total field of view according to FIG. 9c and FIG. 9d, a capturing of the second total field of view may be captured with the image sensor using the first beam-deflecting area 18A, so that this capturing is based on the first wavelength range. In addition, the second total field of view may be imaged with a further capturing by using the beam-deflecting area 18B with the image sensor, so that this capturing is based on the second wavelength range.

The two total fields of view may be arranged along different main directions of the multi-aperture imaging device, e.g. along opposite directions, i.e. along directions that differ approximately by 180°. When performing a continuous rotational movement, e.g. along a sequence analogous to the sequence of FIGS. 9a-d, the beam-deflecting areas may deflect the optical path alternately towards the first total field of view and the second total field of view and alternately with the first beam-deflecting area 18A and the second beam-deflecting area 18B. This may be a possible but not necessary movement sequence. In fact, e.g., the rotational direction that enables a shortest and/or fastest positional change may typically be selected so that the positions may be changed in any sequence, particularly in the case of capturing a third total field of view along a third direction and/or when arranging the total fields of view in an angle unequal to 180°.

The angles of FIGS. 9a-9d may be selected in any sequence, e.g. each being approximately 45°.

A translational displacement of the beam-deflecting means may also be implemented instead of or in combination with the described rotational displacement.

In order to obtain images, image information or images with different wavelength information, pixels of the image sensor may be configured to be operative for both wavelength ranges, and/or cells with different sensitivities may be arranged spatially adjacent so that at least the image sensor area is sensitive as to both wavelength ranges.

For example, the image sensor areas may be configured to generate images in the first wavelength range and to generate images in the second wavelength range. To this end, CMOS pixels may be sensitive, e.g., in the visual range and in the NIR range at the same time, the superimposed color filter array ("CFA"—in the visual range typically in the Bayer arrangement) may also contain "filter pixels" according to the color (red, green, blue; or magenta, cyan, yellow) from which only some and only partially transmit the NIR, however, which is sufficient. Alternatively or additionally, in a cell arrangement, e.g., in the extended Bayer pattern, individual cells may be exchanged for or implemented as cells that are only sensitive in the NIR.

For example, pixels of the image sensor areas may be configured to generate images in the first wavelength range and to generate images in the second wavelength range. Thus, the invention relates to a beam-deflecting means using the facetVISION architecture with a different implementation of the front and rear sides of the mirrors, wherein facetVISION refers to the multi-aperture imaging devices described herein.

A core idea consists in implementing the deflection mirror such that it has different functionalities on its front and rear sides.

This particularly concerns the reflectivity, in particular the spectral reflectivity (i.e. depending on the incident wavelengths), the $1^{st}$ side particularly reflects the visual spectral range (visual—VIS) using the desired beam-deflecting angle, however, it does not reflect the near-infrared (NIR), and the $2^{nd}$ side reflects the NIR using the desired beam-deflection, however, it does not deflect VIS, which is all performed by the dielectric layer systems that are differently implemented on the $1^{st}$ and $2^{nd}$ mirror sides.

This enables the following:

The same camera may be used "simultaneously" or very quickly in succession as a VIS or NIR camera—just by mirror switching.

The mirror no longer necessarily has a wedge shape, but is a simple plane-parallel plate. A 180° rotation is used for mirror switching of VIS/NIR. Possible negative installation space implications in the rotation range of the mirror may be solved by opening and closing cover glasses in the location of the windows (openings of the device).

The camera may be constructed with only a one-sided viewing direction ("world" or "selfie"), the mirror switching (180°) is then only used to change the captured spectral range. However, it may also continue to allow front and rear viewing directions. For example, in rotation steps of 90° of the mirror: world-VIS, selfie-NIR, world-NIR, selfie-VIS.

The combination with field of view division and image stitching (e.g. 2 channels) is obviously possible.

An implementation as a dual camera is also possible, in order to generate a disparity-based depth map for the image stitching (e.g. 4 channels). However, this is not required (and therefore channel-efficient and significantly cost-efficient) because:

The above arrangement may now be combined with structured, or coded, illumination (such as with Kinect) in the NIR (in one mirror position, the camera now sees also in the NIR) and may therefrom generate a depth map which is useful for image-stitching of the VIS image. This all takes place only with two field of view-divided camera channels, the special mirror and only with the help of the NIR dot pattern projector, without an additional NIR camera.

The target of reduction from 4 to 2 channels is achieved even without adding an additional NIR camera (which would be the $3^{rd}$ optical channel), only an additional NIR projector may be used.

Cost reduction while maintaining the advantage of the overall installation height, just through an alternative generation of the depth map, which is partly integrated into the system itself.

Figure 10:
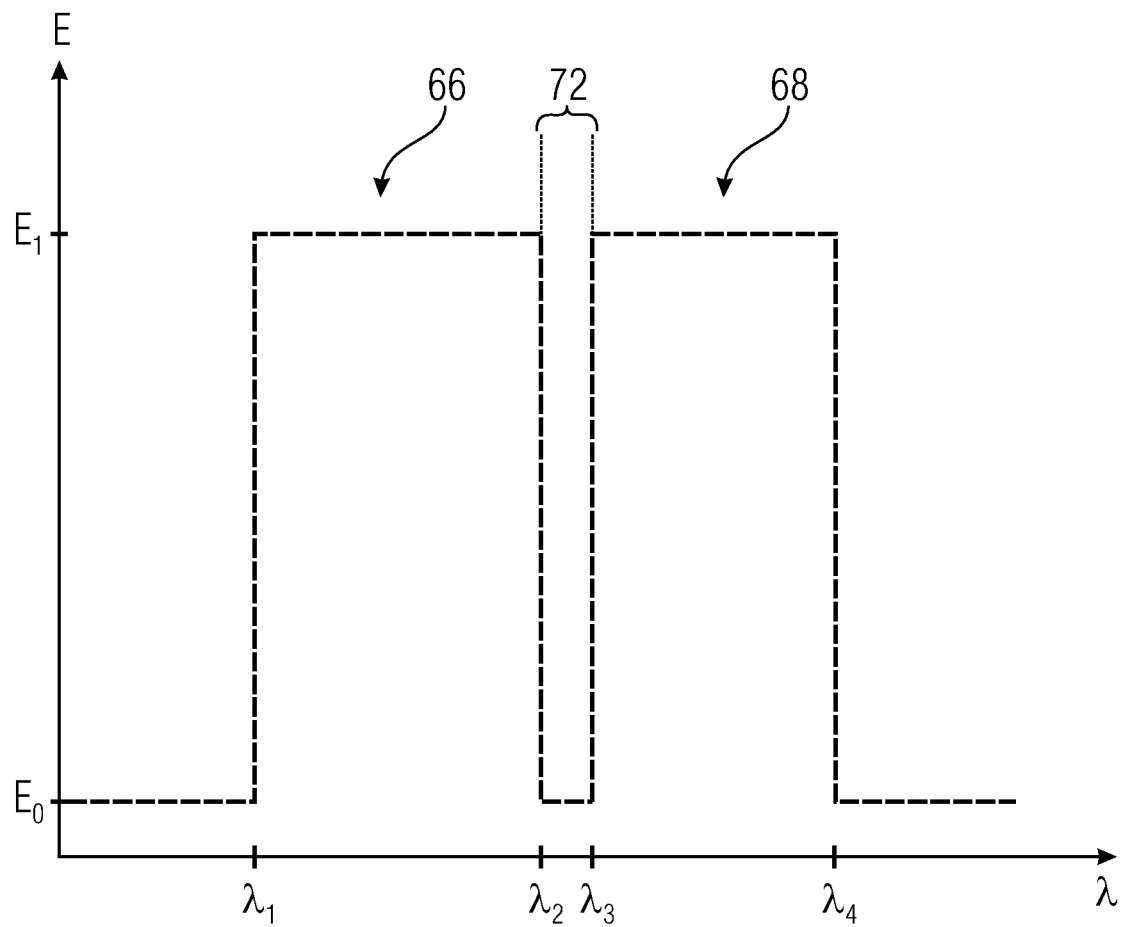
FIG. 10 shows a schematic graph of a sensitivity of an image sensor area of the image sensor of the multi-aperture imaging device across the wavelengths of a first and a second wavelength range according to an embodiment.

FIG. 10 shows a schematic graph of a sensitivity E of an image sensor area of the image sensor of the multi-aperture imaging device across the wavelengths A of wavelength ranges 66 and 68, e.g. the sensitivity of one or several of the image sensor ranges 44a-d. The image sensor ranges may be configured to generate images in the first wavelength range 66 and to generate images in the second wavelength range 68. For example, the first wavelength range 66 is arranged between a first lower wavelength $\lambda_1$ and a first upper wavelength $\lambda_2$, wherein $\lambda_1 < \lambda_2$. For example, the second wavelength range 68 is arranged between a second lower wavelength $\lambda_3$ and a second upper wavelength $\lambda_4$, wherein $\lambda_3 < \lambda_4$. Although FIG. 10 is illustrated such that the second wavelength range 68 comprises larger wavelengths than the first wavelength range 66, it is also possible for the second wavelength range 68 to comprise smaller wavelength than the first wavelength range 66. The wavelength ranges 66 and 68 may overlap one another, however, they may also be spaced apart from one another by an intermediate area 72.

The image sensor area may be configured to generate image data at least in the wavelength ranges 66 and 68, meaning that it comprises a sensitivity $E_1$ at least in the wavelength ranges 66 and 68, which is increased with respect to a sensitivity $E_0$, e.g., where the image sensor range does not generate image data or image signals since it is not sensitive to these wavelengths.

The beam deflection may be carried out selectively for the wavelength ranges 66 and 68 so that attenuating or filtering out wavelengths accordingly takes place outside of the respective wavelength range for which the beam-deflecting area is currently in operative, it being sufficient to only suppress or attenuate wavelengths that are arranged in the complementary wavelength range. For example, this means that a wavelength range for which the image sensor is not sensitive may also be deflected by the beam-deflecting area 18A and/or 18B. In simplified terms, the image sensor area may also be implemented for imaging outside of the wavelength ranges 66 and 68.

For example, the image sensor area may comprise a multitude of image points, i.e. pixels (image elements). Each pixel may be formed from at least one, advantageously several, imaging sensor cells, i.e. which are photo-sensitive. They may be arranged freely or according to a pattern such as a Bayer pattern. For example, a sensitivity of the image sensor area for the second wavelength range 68 may be obtained through a first subset of pixels being sensitive to the first wavelength range 66 and a second subset of different pixels being sensitive to the second wavelength range 68. Depending on the desired resolution of the first and/or second capturing, a pixel of the first subset may be arranged interlaced or alternately, i.e. 1:1, or in any other ratio. Alternatively or additionally, it is possible for one, several, or all of the sensor cells of a pixel to be sensitive to the first and the second wavelength ranges 66 and 68. Alternatively or additionally, it is also possible for the pattern of the sensor cells to be changed for the first wavelength range 66 in such a way that sensor cells that are sensitive to the second wavelength range 68 are added and/or substitute sensor cells from the pattern. Pixels of the image sensor areas may be configured to generate images in the first wavelength range 66 or to at least partially generate images in the second wavelength range 68.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. Multi-aperture imaging device, comprising:
    an image sensor;
    an array of adjacently arranged optical channels, wherein each optical channel comprises an optic for imaging at least one partial field of view of a total field of view onto an image sensor area of the image sensor,
    a beam-deflector for deflecting an optical path of the optical channels,
    wherein the beam-deflector comprises a first beam-deflecting area operative for a first wavelength range of electromagnetic radiation passing through the optical channel; and a second beam-deflecting area operative for a second wavelength range of the electromagnetic radiation passing through the optical channels, the second wavelength range being different from the first wavelength range,
    wherein the multi-aperture imaging device is adapted for at least one of:
    that the first beam-deflecting area is arranged on a first side of the beam-deflector, and the second beam-deflecting area is arranged on a second side arranged opposite to the first side, and the beam-deflector is configured such that, in order to capture a first capturing of the total field of view, the first side is arranged to face the image sensor, and, in order to capture a second capturing of the total field of view, the second side is arranged to face the image sensor;
    that the beam-deflector is formed as an array of facets, wherein each optical channel is assigned to a facet, and each of the facets comprises the first beam-deflecting area and the second beam-deflecting area;
    that the first wavelength range comprises a visible spectrum and wherein the second wavelength range comprises an infrared spectrum, particularly a near-infrared spectrum;
    that the multi-aperture imaging device further comprises an illuminator configured to emit a temporal or spatial illumination pattern with a third wavelength range that at least partially corresponds to the second wavelength range; and
    that the beam-deflector is configured to block or attenuate the second wavelength range with the first beam-deflecting area, and to block or attenuate the first wavelength range with the second beam-deflecting area.

2. Multi-aperture imaging device according to claim 1, configured to capture with the image sensor the first capturing of the total field of view using the first beam-deflecting area so that the first capturing is based on the first wavelength range; and to capture with the image sensor the second capturing of the total field of view using the second beam-deflecting area so that the second capturing is based on the second wavelength range.

3. Multi-aperture imaging device according to claim 2, configured to determine a depth map for the first capturing using the second capturing.

4. Multi-aperture imaging device according to claim 1, wherein a first side of the beam-deflector comprises a coating different from that of a second side opposite thereto in order to be operative in the first and second wavelength ranges, respectively.

5. Multi-aperture imaging device according to claim 1, wherein the beam-deflector is configured, when operative in the first wavelength range, to reflect the first wavelength range and to at least partially absorb wavelength ranges different thereto, and/or the beam-deflector is configured, when operative in a second wavelength range, to reflect the second wavelength range and to at least partially absorb wavelength ranges different thereto.

6. Multi-aperture imaging device according to claim 1, wherein the total field of view is a first total field of view, and comprising a first viewing direction for capturing the first total field of view and a second viewing direction towards a second total field of view;
    wherein the multi-aperture imaging device is configured to capture with the image sensor a third capturing of the second total field of view, using the first beam-deflecting area so that the third capturing is based on the first wavelength range; and to capture with the image sensor a fourth capturing of the second total field of view using the second beam-deflecting area so that the fourth capturing is based on the second wavelength range.

7. Multi-aperture imaging device according to claim 1, wherein the first total field of view and the second total field of view are arranged along different main directions of the multi-aperture imaging device, and wherein the beam-deflecting areas, when executing a continuous rotational movement, deflect the optical path alternately towards the first total field of view and the second total field of view and alternately with the first beam-deflecting area and the second beam-deflecting area.

8. Multi-aperture imaging device according to claim 1, wherein the beam-deflector is configured, for acquiring the first capturing of the total field of view, to comprise a tilt angle $\alpha_1$ of 45°±10° of the first beam-deflecting area with respect to the image sensor, and, for acquiring the second capturing of the total field of view, to comprise a tilt angle $\alpha_2$ of 45°±10° of the second beam-deflecting area with respect to the image sensor.

9. Multi-aperture imaging device according to claim 1, configured to capture the total field of view through at least two partial fields of view, and to capture at least one of the partial fields of view through at least one first optical channel and one second optical channel.

10. Multi-aperture imaging device according to claim 9, configured to segment the total field of view into exactly two partial fields of view, and to capture exactly one of the partial fields of view through a first optical channel and a second optical channel.

11. Multi-aperture imaging device according to claim 9, wherein the first optical channel and the second optical channel are spaced apart in the array through at least one further optical channel.

12. Multi-aperture imaging device according to claim 1, wherein the facets of the array of facets are formed as mirrors that are plane-parallel and reflective on both sides.

13. Multi-aperture imaging device according to claim 1, wherein the image sensor areas are configured to generate images in the first wavelength range and to generate images in the second wavelength range.

14. Multi-aperture imaging device according to claim 13, wherein the pixels of the image sensor areas are configured to generate images in the first wavelength range and to at least partially generate images in the second wavelength range.

15. Multi-aperture imaging device according to claim 1, configured to at least stereoscopically capture the total field of view.

16. Device comprising a multi-aperture imaging device, said multi-aperture imaging device comprising:
an image sensor;
an array of adjacently arranged optical channels, wherein each optical channel comprises an optic for imaging at least one partial field of view of a total field of view onto an image sensor area of the image sensor,
a beam-deflector for deflecting an optical path of the optical channels, wherein the beam-deflector comprises a first beam-deflecting area operative for a first wavelength range of electromagnetic radiation passing through the optical channel; and a second beam-deflecting area operative for a second wavelength range of the electromagnetic radiation passing through the optical channels, the second wavelength range being different from the first wavelength range,
wherein the multi-aperture imaging device is adapted for at least one of:
that the first beam-deflecting area is arranged on a first side of the beam-deflector, and the second beam-deflecting area is arranged on a second side arranged opposite to the first side, and the beam-deflector is configured such that, in order to capture a first capturing of the total field of view, the first side is arranged to face the image sensor, and, in order to capture a second capturing of the total field of view, the second side is arranged to face the image sensor;
that the beam-deflector is formed as an array of facets, wherein each optical channel is assigned to a facet, and each of the facets comprises the first beam-deflecting area and the second beam-deflecting area;
that the first wavelength range comprises a visible spectrum and wherein the second wavelength range comprises an infrared spectrum, particularly a near-infrared spectrum;
that the multi-aperture imaging device further comprises an illuminator configured to emit a temporal or spatial illumination pattern with a third wavelength range that at least partially corresponds to the second wavelength range; and
that the beam-deflector is configured to block or attenuate the second wavelength range with the first beam-deflecting area, and to block or attenuate the first wavelength range with the second beam-deflecting area,
configured to generate a depth map of the total field of view.

17. Device according to claim 16, not comprising an additional infrared camera.

18. Device according to claim 16, configured to capture the total field of view from a perspective, and not providing a stereoscopic capturing of the total field of view.

* * * * *